(12) United States Patent
Maor et al.

(10) Patent No.: US 9,305,319 B2
(45) Date of Patent: Apr. 5, 2016

(54) CONTROLLING SOCIAL NETWORK VIRTUAL ASSEMBLY PLACES THROUGH PROBABILITY OF INTERACTION METHODS

(76) Inventors: Yehonatan Rafael Maor, Tel Aviv (IL); Ofer Rundstein, Tel Aviv (IL); Meishar Meiri, Tel Aviv (IL); Gad Mordechi Maor, Tel Aviv (IL); Adam Rakib, Tel Aviv (IL); Yossi Sadoun, Tel Aviv (IL)

( * ) Notice: Subject to any disclaimer, the term of this patent is extended or adjusted under 35 U.S.C. 154(b) by 0 days.

(21) Appl. No.: 13/275,186

(22) Filed: Oct. 17, 2011

(65) Prior Publication Data

US 2012/0096352 A1 Apr. 19, 2012

Related U.S. Application Data

(60) Provisional application No. 61/394,151, filed on Oct. 18, 2010.

(51) Int. Cl.
*G06F 3/048* (2013.01)
*G06Q 50/00* (2012.01)
*H04L 12/58* (2006.01)
*G06Q 10/10* (2012.01)
(Continued)

(52) U.S. Cl.
CPC ............... *G06Q 50/01* (2013.01); *A63F 13/12* (2013.01); *G06Q 10/10* (2013.01); *H04L 51/32* (2013.01); *A63F 2300/535* (2013.01); *A63F 2300/5533* (2013.01); *A63F 2300/5553* (2013.01); *A63F 2300/8082* (2013.01); *H04L 12/185* (2013.01); *H04L 12/1822* (2013.01)

(58) Field of Classification Search
CPC .... G06Q 50/01; G06Q 10/10; G06F 3/04815; A63F 13/12; H04L 51/31; H04L 12/1822
USPC ........................... 715/757, 758, 753; 705/319
See application file for complete search history.

(56) References Cited

U.S. PATENT DOCUMENTS 6,772,195 B1 * 8/2004 Hatlelid et al. ............... 709/204
7,451,161 B2 * 11/2008 Zhu et al.
8,026,918 B1 * 9/2011 Murphy ........................ 345/473
(Continued)

OTHER PUBLICATIONS

"Facebook Gets Innovative Mingleverse 3D Voice Chat and Live Media Sharing," Apr. 21, 2010, PRWeb, available at http://web.archive.org/web/20100422205650/http://www.prweb.com/releases/Mingleverse/3D-Voice-Chat/prweb3901544.htm.*

(Continued)

*Primary Examiner* — Doon Chow
*Assistant Examiner* — Andrew T Chiusano
(74) *Attorney, Agent, or Firm* — Stephen E. Zweig

(57) ABSTRACT

A system and method for controlling a social network based virtual world, in which users are represented by avatars that in turn are linked to the user's real world social network social profiles. The users may virtually meet in various different virtual meeting places or "rooms". In order to promote development of new and productive virtual relationships with a high degree of relevance to the user's real world experience, the system makes use of probability to interact (PTI) methods and algorithms. The PTI method keeps track of both the respective user's real-world interactions and virtual world interactions, computes one or more PTI values, and uses these PTI values to control the distribution of the user's avatars in a social interaction optimized manner. The PTI methods may also be used to control avatar appearance, suggest virtual events, and control the output of virtual event search engines.

22 Claims, 18 Drawing Sheets

(51) Int. Cl.
*A63F 13/30* (2014.01)
*H04L 12/18* (2006.01)

(56) References Cited

U.S. PATENT DOCUMENTS

| | | | | |
|---|---|---|---|---|
| 8,539,359 B2* | 9/2013 | Rapaport et al. | ............... | 715/751 |
| 8,812,358 B2* | 8/2014 | Tirpak | ................... | A63F 13/12 |
| | | | | 705/14.4 |
| 2001/0020253 A1* | 9/2001 | Arao | ............................. | 709/228 |
| 2008/0201425 A1* | 8/2008 | Baker | ................... | G06Q 30/02 |
| | | | | 709/204 |
| 2009/0106040 A1* | 4/2009 | Jones | ................................ | 705/1 |
| 2009/0113314 A1* | 4/2009 | Dawson et al. | ................ | 715/757 |
| 2009/0228944 A1* | 9/2009 | Bodlaender | .................... | 725/110 |
| 2009/0271206 A1* | 10/2009 | Bhogal et al. | ...................... | 705/1 |
| 2009/0271714 A1* | 10/2009 | Cox et al. | ....................... | 715/753 |
| 2010/0070884 A1* | 3/2010 | Bromenshenkel et al. | ... | 715/757 |
| 2010/0169798 A1* | 7/2010 | Hyndman et al. | ............. | 715/757 |
| 2012/0166532 A1* | 6/2012 | Juan et al. | ..................... | 709/204 |

OTHER PUBLICATIONS

"Miniature," Feb. 21, 2015, Merriam-Webster Dictionary, available at <http://www.merriam-webster.com/dictionary/miniature>.*

* cited by examiner

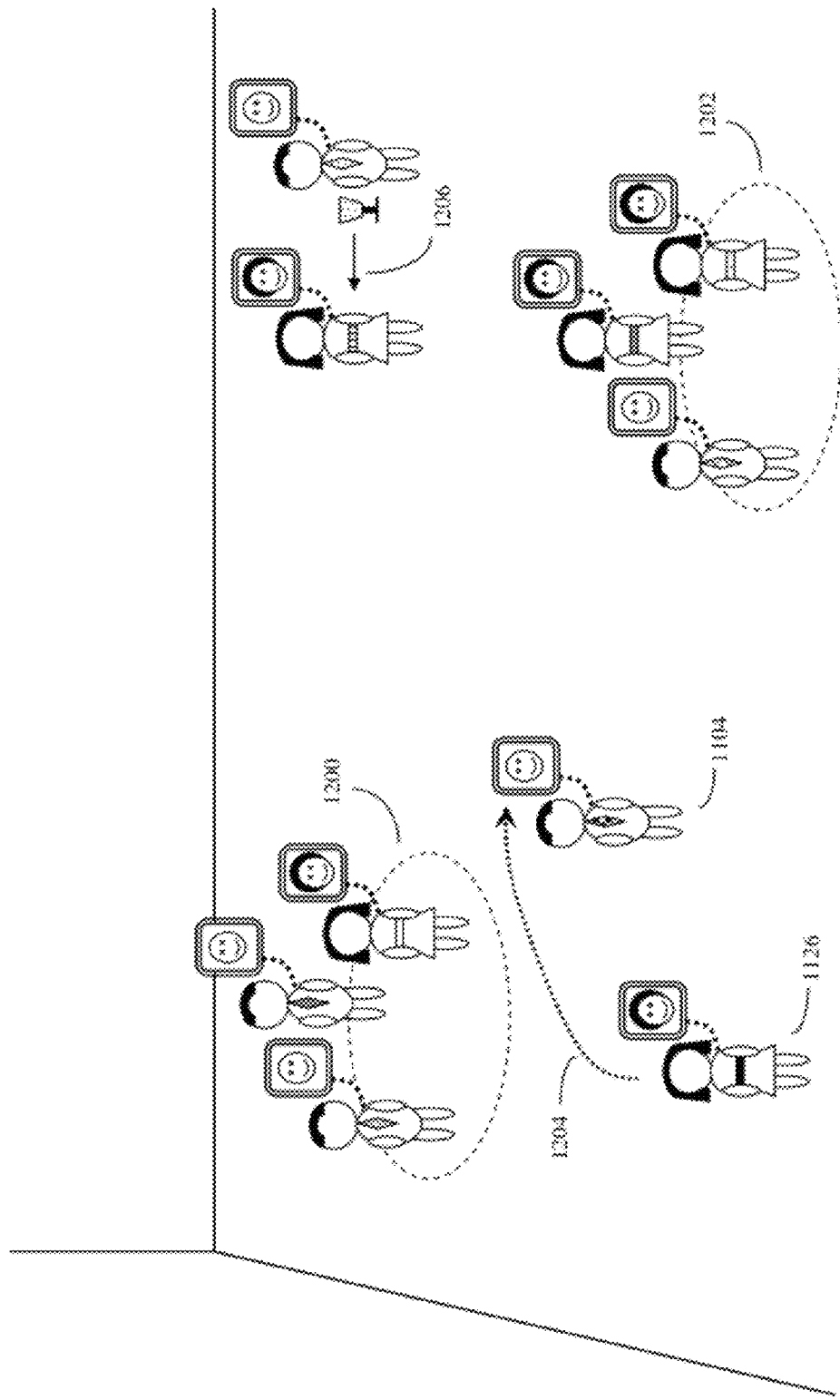

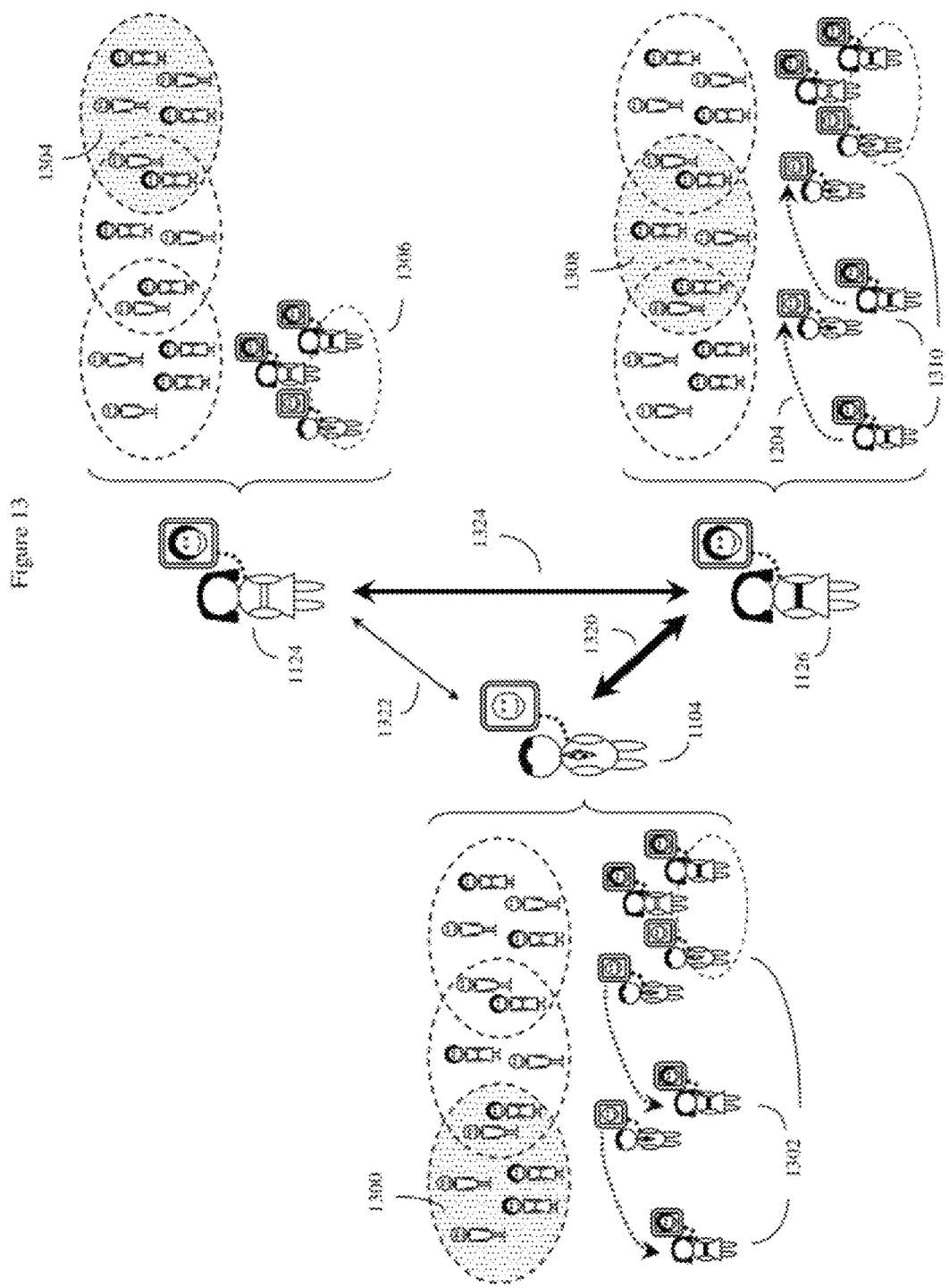

Figure 14

| Feature | Domain | Values | Weight |
|---|---|---|---|
| Facebook friend request sent | $\{n\|n=0,1\}$ | $v(n)=\begin{cases}1 & n=1\\ 0 & n=0\end{cases}$ | 0.15 |
| Came in through a Shaker invitation sent by the other person | $\{n\|n=0,1\}$ | $v(n)=\begin{cases}1 & n=1\\ 0 & n=0\end{cases}$ | 0.05 |
| Number of invitations sent | $\{n\|n\in\mathbb{N}\}$ | $v(n)=\begin{cases}0 & n=0\\ 0.7 & n=1\\ 1 & n\geq 2\end{cases}$ | 0.25 |
| Number of mini-profile views | $\{n\|n\in\mathbb{N}\}$ | $v(n)=\begin{cases}0 & n=0\\ 0.2 & n=1\\ 0.7 & n=2\\ 1 & n>2\end{cases}$ | 0.05 |
| Number of drinks sent | $\{n\|n\in\mathbb{N}\}$ | $v(n)=\begin{cases}0 & n=0\\ 0.3 & n=1\\ 0.7 & n=2\\ 1 & n>2\end{cases}$ | 0.05 |
| Number of pictures viewed | $\{n\|n\in\mathbb{N}\}$ | $v(n)=\begin{cases}0 & n=0\\ 0.3 & 1\leq n\leq 5\\ 0.7 & 6\leq n\leq 10\\ 1 & n>10\end{cases}$ | 0.05 |
| Number of drinks accepted | $\{n\|n\in\mathbb{N}\}$ | $v(n)=\begin{cases}0 & n=0\\ 0.3 & n=1\\ 0.7 & n=2\\ 1 & n>2\end{cases}$ | 0.025 |
| Number of chat invites accepted | $\{n\|n\in\mathbb{N}\}$ | $v(n)=\begin{cases}0 & n=0\\ 0.5 & n=1\\ 1 & n>1\end{cases}$ | 0.025 |
| Number of chats started | $\{n\|n\in\mathbb{N}\}$ | $v(n)=\begin{cases}0 & n=0\\ 0.3 & n=1\\ 0.7 & n=2\\ 1 & n>2\end{cases}$ | 0.1 |
| Number of who's here clicks | $\{n\|n\in\mathbb{N}\}$ | $v(n)=\begin{cases}0 & n=0\\ 0.3 & n=1\\ 0.7 & n=2\\ 1 & n>2\end{cases}$ | 0.15 |

Figure 15

| Feature | Domain | Values | Weight |
|---|---|---|---|
| Degree of Separation | $\{n\|n=1,2,\text{more than }2\}$ | $v(n)=\begin{cases}1 & n=1\\0.5 & n=2\\0 & n=\text{more than }2\end{cases}$ | 0.3 |
| Number of mutual friends | $\{n\|n\in\mathbb{N}\}$ | $v(n)=\min(0.1n,1)$ | 0.3 |
| Same hometown | $\{n\|n=0,1\}$ | $v(n)=\begin{cases}1 & n=1\\0 & n=0\end{cases}$ | 0.025 |
| Same location | $\{n\|n=0,1\}$ | $v(n)=\begin{cases}1 & n=1\\0 & n=0\end{cases}$ | 0.025 |
| Same school | $\{n\|n=0,1\}$ | $v(n)=\begin{cases}1 & n=1\\0 & n=0\end{cases}$ | 0.25 |
| Opposite gender | $\{n\|n=0,1\}$ | $v(n)=\begin{cases}1 & n=1\\0 & n=0\end{cases}$ | 0.1 |
| Age match | $\{n\|n=0,1\}$ | $v(n)=\begin{cases}1 & n=1\\0 & n=0\end{cases}$ | 0.1 |

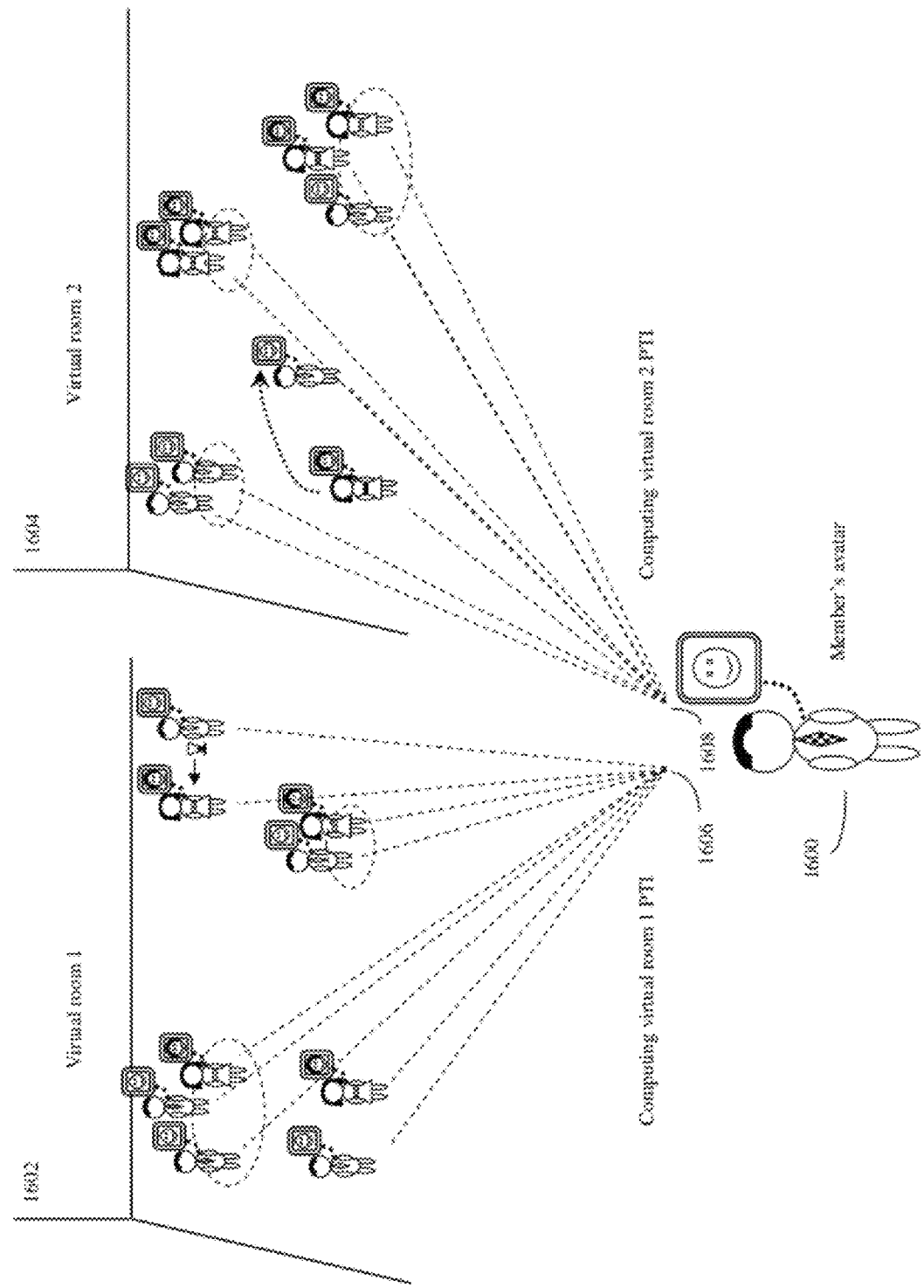

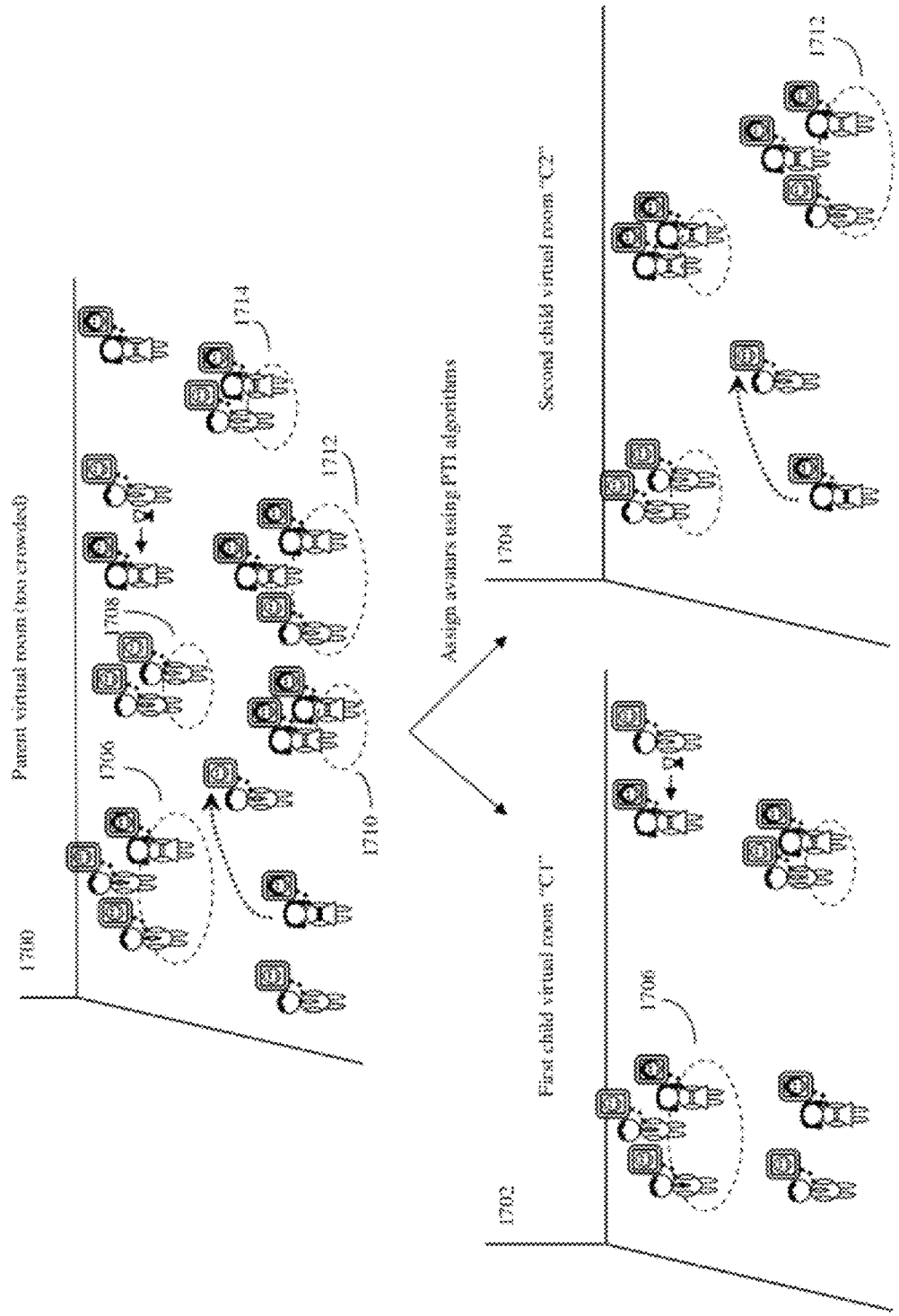

Figure 18

1. Let $c_1,...,c_k$ denote the conversations in the room. For $i = 1,...,k$, denote $e_i^1,...,e_i^{m_i}$ its participants.

2. Consider all pairs of conversations.

3. Per pair $c_i$ and $c_j$, calculate $$JPTT(c_i,c_j) = \sum_{\alpha=1}^{m_i}\sum_{\beta=1}^{m_j} JPTT(e_\alpha^i, e_\beta^j)$$

$$0 = \sum_{\alpha=1}^{m_i}\sum_{\beta=1}^{m_j} PTT(e_\alpha^i, e_\beta^j) + \sum_{\alpha=1}^{m_i}\sum_{\beta=1}^{m_j} PTT(e_\beta^j, e_\alpha^i)$$

4. Find the two conversations with minimal $JPTT$.

Denoting $n$ to be the number of people in the room, this will run in $O(n^4)$. We can reduce this to $O(n)$ if we turn the weights into binary.

Figure 19

This step is a greedy step designed to keep the as many of the people in the smaller container happy while disappointing as little as possible people in the larger container. An algorithm for achieving this will be:

1. Let $c_1,...,c_k$ denote the conversations in the room, not in any of the containers yet. For $i = 1,...,k$, denote $c_i^1,...,c_i^{m_i}$ its participants 2. Denote $d_1,...,d_s$ the people in container $C_1$ and $e_1,...,e_t$ the ones in container $C_2$ where $s \leq t$ 3. For $i = 1,...,k$, calculate $$D(c_i) = JPTT(C_1,c_i) - JPTT(C_2,c_i)$$
$$0 = \sum_{l=1}^{s}\sum_{p=1}^{m_i} JPTT(d_l,c_i^p) - \sum_{l=1}^{t}\sum_{p=1}^{m_i} JPTT(e_l,c_i^p)$$

4. Put in $C_1$ the conversation $c_i$ such that $D(c_i)$ is maximal

Denoting $n$ to be the number of people in the room, this will run in $O(n^3)$. Again, we can reduce this to $O(n)$ if we turn the weights into binary.

All together, the algorithm runs in $O(n^3)$ and can be reduced to $O(n^2)$ with minor modifications.

CONTROLLING SOCIAL NETWORK VIRTUAL ASSEMBLY PLACES THROUGH PROBABILITY OF INTERACTION METHODS

CROSS REFERENCE TO RELATED APPLICATIONS

This application claims the priority benefit of provisional patent application 61/394,151, entitled "SOCIAL NETWORK BASED VIRTUAL ASSEMBLY PLACES", inventors Yehonatan Rafael Maor, Ofer Rundstein, Meishar Meiri, Gad Mordechai Maor, Adam Rakib, and Yossi Sadoun, filed Oct. 18, 2010; the contents of this application are incorporated herein by reference.

BACKGROUND OF THE INVENTION

1. Field of the Invention

The invention is in the general fields of computerized social networks, virtual worlds, and computer simulations of real world environments.

2. Description of the Related Art

Prior art online social networks offer a chance to stay connected with existing friends, meet new people, express one's self and one's thoughts, share photos, links and posts, and also offer additional applications such as games and dating.

Although the online social network market has expanded very rapidly in recent years, the market is dynamic, as different particular social networks and their associated organizations can increase and decrease in popularity. MySpace for example was initially a very strong contender in this field, but then fell out of favor. At present, the field is dominated by Facebook, with other major sites including Twitter, LinkedIn, MySpace, Ning, Google+ and Tagged.

As of October 2011, Facebook claims more than 800 million active users, that more than 50% of their active users log onto Facebook every day, and that the average Facebook user has approximately 130 friends.

At the same time, social games, such as Zynga (makers of popular Facebook games such as Mafia Wars, Farmville, and the like), World of Warcraft, and the like have also become popular. Zynga, for example itself has millions of active users. However these prior art social games generally have user bases that are composed of users who have signed up for the game itself. Although individuals in these games may design avatars (i.e. computer representations of the user's game alter ego) to play the game, these avatars will generally bear little relationship to the user's real life appearance and characteristics. Indeed this is part of the appeal of these games, because a small person in real life, for example, may want to portray themselves as large and imposing in the game.

Previous art in this area includes U.S. Pat. No. 6,772,195 B1, US application US 2009/0271714 A1, US 2008/0040673 A1,

BRIEF SUMMARY OF THE INVENTION

Despite the proliferation of online social networks and games, methods of meeting new people online are still inadequate. Social networks mainly allow members to connect with friends that they already have met, and online games mainly allow users to connect for the limited purpose of playing the games. Thus there is still nothing that allows an individual to meet new people with the same degree of ease and reliability that exists for example, in a real life social party situation.

In a real life social party, friends may invite other friends, and these friends will in turn invite both friends of friends, and also friends of friends of friends, and so on. Because the initial guest list is at least partially screened, an individual at a real life social party has some assurance that the stranger that they may meet will likely have at least a few things in common with them, because the individual and the stranger are connected by only a few degrees of social separation. This helps insure compatibility, and increases the chance that the meeting may ultimately be found to be worthwhile from a romantic, friendship, political or business perspective. In other words, the probability of a real-world party attendant having a positive interaction with other party attendees is often fairly good.

In real life, one of the reasons why people go to real parties is to expand their social networks, and potentially reap the benefits that an expanded social network brings to almost every area of life. However neither prior art social networks nor prior art social games enable the same type of natural social network expansion that is possible in an everyday party setting, where all party members present will only have at most a few degrees of social separation from each other.

At the same time, due to the statistics of the proliferation of online social networks, and the large amount of time individuals spend interacting online with the social networks each day, the social network environment has tended to supplant much of the time that individuals would, in earlier years, have spent interacting in real life. For example, when the average user with about 130 online friend connections enters a social network, at any given time it is now statistically likely that about 30 of the user's friends will also be online.

In one embodiment, the invention provides a virtual environment or virtual platform where social networks and community website users are able to gather online much as they would in real life. The goal is to capture as closely as possible the vivid details of real life environments, such as parties, where people can not only meet existing friends, but also meet friends of friends, and more distantly connected individuals, that they might not have a chance to meet otherwise.

In order to do this, a number of different software features and methods are required. These include software features that 1) create a social interaction platform that is layered over a previously established social network populated with real-world data from real-world users; 2) help the user make new acquaintances that are significant to his/hers real life by providing virtual environments (rooms) populated with other users/members where the probability of (positive) interactions is generally high; and 3) provide the user with a guide to various virtual events where again, the probability of encountering other members and having a positive interaction is high. This probability of (positive) interactions (probability to interact) is generally abbreviated in this specification as PTI.

Thus the basic spirit of the invention is to provide social networks and community websites where users can gather and interact online in a manner that is similar to a vivid, real-life event. Like high quality real life events, these virtual events may on the average populated with other users that may have some degree of compatibility with each other.

Thus in one embodiment, the invention may be a method of providing virtual meeting environments for avatars controlled by human users, and where the PTI of the various users may have been optimized in some manner. Each avatar may be associated with the user information from at least one social network such as Facebook, and the user's profile picture and sex can control the general appearance of the avatars. The avatar appearance can also be customized according to their user's social network relationships such as friends, friends of friends, or strangers. The avatar appearance may also be customized according to other probability to interact (PTI) considerations. Various online virtual events, such as virtual parties, meeting rooms and the like may be created, PTI optimized, and other social network users, such as high PTI social network users may be invited to participate by sending messages inviting the other users to send their avatars to the meeting environment. In the virtual meeting environment, the various avatars may move about and interact with one another according to real-world rules, such as the rule that only avatars that are portrayed as physically being closely associated to each other in the virtual world may chat or interact with each other, as well as exchange social network user information. Various virtual environment search engines, such as PTI optimization search engines are also provided.

More specifically, in one embodiment, the invention may be based, at least in part, on an underlying method for estimating the probability of interaction (PTI) between two avatars sharing the same online virtual environment, where as previously discussed, these avatars are associated with and controlled members of an online social network such as Facebook.

At the highest level, this PTI estimation method may comprise determining the time history of virtual world interactions between the member's avatars on in the virtual environment, and using this information to compute at least one virtual world PTI predictor value. Thus for example, of two avatars have interacted favorably in the past in the virtual environment, the probably of their future interactions may be higher. The method also comprises additionally determining the degree of "real world" social connection similarity between the various virtual environment members and generating a social connection PTI predictor value as well. Thus for example, if two virtual environment members who are controlling the avatars have had a prior real world environment in common—e.g. same school, same social network of friends, same interest, similar age, and the like, then the probability of their future interactions in the virtual world will also be higher.

The invention can then combine these virtual world (virtual world interactions) and real world (social connection similarity) interactions between the members and their avatars in an aggregate function produces an overall probability to interact (PTI) value that can be very useful for controlling avatar interactions in the online virtual environment.

As will be discussed, this underlying PTI estimation method can be used for a number of purposes, including allowing virtual environment members to be automatically placed into virtual environments populated with avatars from other members where the probably of the members interacting is good. The PTI estimation method can also be used by the virtual environment system administration computer processors to automatically but intelligently expand or contract virtual environment "rooms" according to demand. For example, the system may partition the avatars in overcrowded virtual environment "rooms" into multiple "child" rooms, each with a fewer number of avatars. Here PTI considerations can be used to intelligently grouping the avatars into their respective child room(s) where the probability of interaction between the members controlling the avatars and other members in the virtual child room is optimized for a high probability to interact. Conversely, sparsely populated virtual environments may be intelligently consolidated into a higher populated virtual environment where again this consolidation is PTI optimized. Other uses and variations on this basic method will also be discussed.

BRIEF DESCRIPTION OF THE DRAWINGS

FIG. 12 shows an example of some of the various virtual world interactions between the avatars of the members of a social network based online virtual environment.

FIG. 13 shows how the probability to interact (PTI) between members of a social network based online virtual environment can be estimated as an aggregate function of their various real world (social connection) interactions and various virtual world interactions.

FIG. 14 shows an example of some of the virtual world interaction components of the invention's PTI algorithm and method.

FIG. 15 shows an example of some of the real world (social connection) interaction components of the invention's PTI algorithm and method.

FIG. 16 shows how the invention's PTI methods can be used to intelligently split a crowded "virtual room" into two "child" virtual rooms that are less crowded, but where the probability to interact between the various member avatars in the two less crowded rooms has been optimized.

FIG. 17 shows how the invention's PTI methods can be used to help determine which virtual environment may be best suited for a member's avatar.

FIG. 18 shows a mathematical example of an algorithm that uses PTI methods to partition avatars from a main "parent" room into two less populated "child" rooms.

FIG. 19 shows an alternate mathematical example of an algorithm that uses PTI methods to partition avatars from a main "parent" room into two less populated "child" rooms.

DETAILED DESCRIPTION OF THE INVENTION

Figure 1:
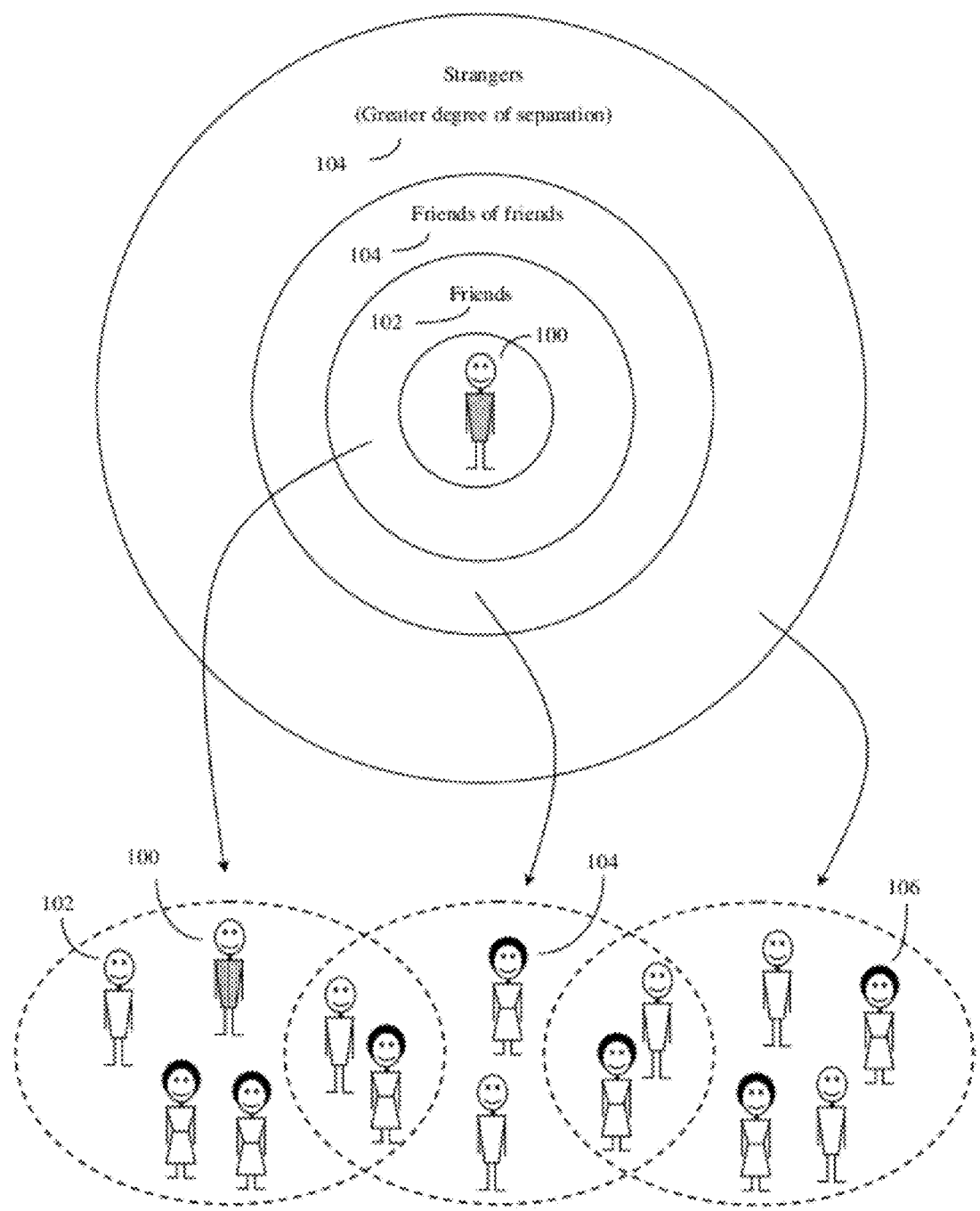
FIG. 1 shows two Venn diagrams of an individual's real-world social network, showing how an individual will have an immediate group of friends, a group of friends of friends, as well as more distant social network degrees of separation as well.

Here, the invention's social network based realistic virtual world, which was previously named "Agora" in applicant's earlier provisional patent application 61/394,151, the contents of which are incorporated herein by reference, will in this specification often be called by its newer commercial name of "Shaker" or often "Agora/Shaker". With the exception of the name change, however the teachings of 61/394,151 with respect to Agora should, absent discussion otherwise, be assumed to apply to "Shaker" and this specification as well.

Note also that in this specification, the terms users and members, user/members or member/users are used interchangeably. Further, since we are dealing with a system that creates virtual world avatars based on the user/member real world social network data, whenever avatars are discussed, it should be assumed that that avatar is controlled by a unique human user who is registered on a social network. Similarly, when members or users are discussed, it should be assumed that they are represented by avatars in the virtual world.

Agora/Shaker is based on multiple inventions, many of which leverage off of each other. The present invention's PTI algorithm methods are to some extent based on, and also facilitate, other Agora/Shaker inventions regarding the unique Agora/Shaker social network based virtual world or virtual environment.

Before going into a detailed discussion of the invention's probability to interact (PTI) methods, a discussion of other aspects of the Agora/Shaker system, and in particular the system's unique social network based virtual world is in order.

Here, in order to better facilitate an understanding of the why the invention's PTI methods are so very useful in a social network based virtual environment, a series of various social network virtual environment functions will be described. Then, after the overall functions have been described, the specific PTI methods and algorithms that help support these various functions will be shown in detail.

The Agora/Shaker social network based virtual world or environment may be viewed as being a system and method of providing at least one computer network virtual meeting environment for a plurality of avatars. This method will generally comprise associating each of this plurality of avatars with the human user or member information from at least one social network, such as Facebook, which itself will be comprised of many (often millions) of different human users or members. Here the social network will preferably be a popular and established social network such as Facebook that already contains user information regarding the real world social interactions between the users (e.g. friends, friends of friends, and so on), user real world photographic information, and user real world biographic information.

The social network user photographic information, such as the user's profile picture, user biographic information (such as the user's sex) and the like can be used to provide visual labels and appearances for these avatars, thus producing a plurality of social network labeled or configured avatars. These social network labeled or configured avatars may be used to populate the invention's various online virtual meeting environments.

Typically these virtual meeting environments will be populated with various social network labeled avatars, usually by invitation or by a user's finding the virtual event on a virtual event search engine, which may be PTI optimized for this purpose. These avatar populated virtual meeting environments may be displayed on the graphical user interfaces (often web browsers) of computerized network (often the Internet) connected computerized devices (often computers and/or smart cellular phone devices) running under the control of at least some of the various social network users. Using this system and method, the users may control the movement of their respective social network labeled avatars within these virtual meeting environments, interact with the social network labeled/configured avatars belonging to other users, informally or formally exchange information, and obtain at least some social network user information based on these interactions.

Although the Agora/Shaker social network based, realistic virtual world, may run on a wide variety of different social networks, in view of Facebook's present large (>60%) market share, many of the examples and discussion in this disclosure will use the Facebook social network as an example, and will also use the Facebook social network naming convention to describe various social network functions. This use of Facebook examples and terminology is intended as a concise way to convey some of the complex social network functionality, but is not intended to be limiting. In alternative embodiments, the invention may be run on other social networks (e.g. MySpace, Google+, Google+ Circles, etc.) and may employ functionality similar to Facebook functionality under alternate names.

Many of the Shaker options described in this invention will operate better if the Shaker users agree to set at least some of their social network privacy options at a lower level. In general Shaker will be designed to operate at multiple social network privacy settings, inform users as to their privacy settings as the user desires, and also suggest privacy settings that attempt to strike a balance between the user needs to expand his or her social network, and the user's competing needs for certain levels of privacy. Depending upon the event, some events may request a temporary lower privacy setting as a condition for attendance, and optionally allow the user to have the system automatically restore the previous privacy settings upon exit. Other events may allow users with all privacy levels to attend. For the purposes of the various examples and embodiments discussed in this disclosure, it is assumed that all users have set their privacy settings to minimal level (i.e. minimal privacy, expose a lot of personal information), at least for the duration of the Shaker event.

FIG. 1 shows the basic social model behind much of the Shaker system. This model of social interactions assumes that any individual's real-world social universe consists of first himself or herself (100), followed by a layer of friends and trusted associates (102) that the user knows directly. In a social network, this layer (102) is typically called a "Friends" layer. Surrounding this "friends" layer is the user's natural social environment, which will normally consist of associates or friends of the user's friends (104). In social network terminology, this second layer is typically called a "Friends of Friends layer" (104), which is distant from the user by at least one degree of separation. This second layer can occasionally also contain more remote acquaintances connected to the use by two degrees of separation. Finally there is a layer composed of friends of friends of friends or still more distant relationships (106). Although in the real world, of course, sometimes total strangers can meet and form a close relationship, on a statistical basis, most of the time that an individual meets new people in the real world, the new people are separated from the individual by only one or two degrees of social separation. This relatively close relationship tends to foster trust and congeniality, because often the two "strangers" share a set of friends or acquaintances in common. Agora/Shaker makes extensive use of the fact that this one or two degree of separation information can, given the proper privacy waivers, be extracted from pre-existing social networks.

Figure 2:
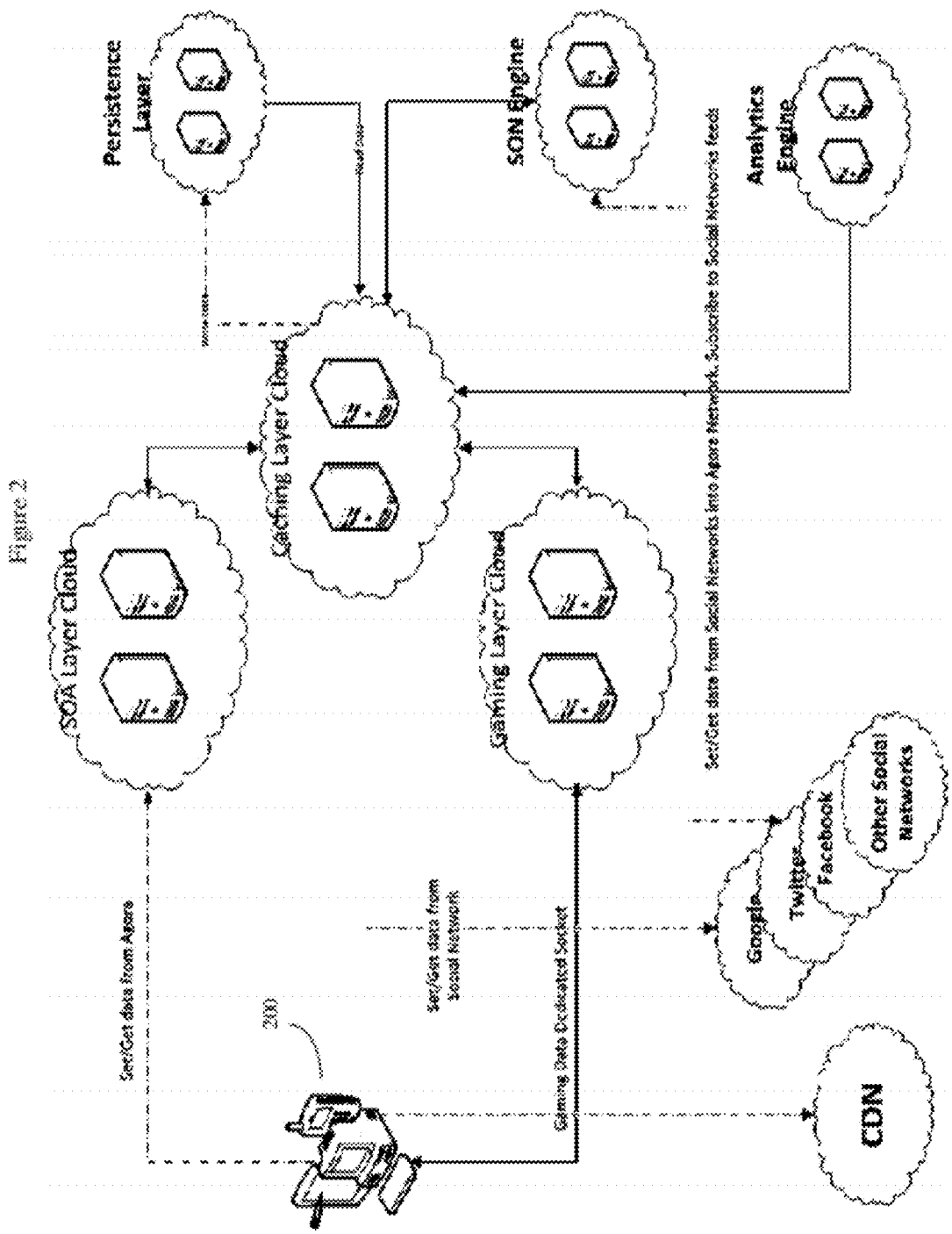
FIG. 2 shows a network diagram showing one possible set of Internet network interconnections between the computer servers and other computerized components that control various online social networks, and the computer servers and other computerized components that control the Agora/Shaker system.

FIG. 2 shows one embodiment of the main computer network and main components of the Invention's Agora/Shaker architecture. The various Agora/Users interact with the Agora/Shaker system though the graphical user interfaces [often web browsers] of their various computerized devices (200) (e.g. desktop or laptop computers, tablet computers, Smartphones, and the like) via standard network (usually internet) connections. The rest of FIG. 2 shows the "back end" of the system where the various servers and other elements interact to produce the various output as seen by the various users.

These other components include 1) an SOA Layer Cloud, which may handles all business logic, including but not only, handling Shaker virtual events, handling users, handling mailboxes, DOS/FOF information and more; 2) one or more Gaming Servers, which may handle all interactions between users in the rooms, for example: user moves, user talks, and other functions; 3) a SON Engine, which may be responsible for all interactions with external social networks like Facebook, Twitter, MySpace, Google+ and other networks. Here the SON Engine can be designed to handle support for various social networks as plugins, so that additional social networks can be easily added to the system; 4) a Persistence Layer, which may act as the system Relational Database RDBS system, and may, for example, for scalability and availability, be based on shard MySQL instances or other database method; 5) a Caching layer, here, for example, the caching layer may be in a memory distributed Java environment, where each node has backup on at least on other node. Here all data may be kept in memory (e.g. system RAM) as long as possible. Thus data in the cache may persist in the persistence layer asynchronously, and may be read from the database when it doesn't synchronously exist in cache; 6) a CDN (content distribution network)—here the system static data may be kept in an external CDN service; and 7) an Analytics Engine, which may read data from the cache, and run analytics calculations on the Shaker data.

All components may be monitored by central applicative monitoring and managing software with special features dedicated to the Agora/Shaker environment. The various software components can usually scale exponentially (some can scale linearly). All component configurations can be dynamically changed by the Agora/Shaker monitoring and managing system. In certain cases, the Google MapReduce software framework methods, as exemplified by U.S. Pat. No. 7,650,331, the contents of which are incorporated herein by reference, may be used. These methods were also discussed in appendix 1 of 61/394,151, and contents of appendix 1 of this disclosure are also incorporated herein by reference.

Creating a Social Interaction Platform, Layered Over a Social Network

The operating philosophy behind the software design and functionality of Agora/Shaker (Shaker) is that Shaker should mimic many aspects of real life. Indeed, the default Agora/Shaker software design assumption, unless otherwise stated, is that the various software features in Shaker will mimic real life as closely as possible in the Shaker's Internet based, graphical user interface (GUI) platform, as viewed by the various users using their respective computerized devices. Users will generally interact with Shaker using the same standard web browsers that they use to interact with Facebook, Google+ and other social networks. Indeed, often Shaker may be accessed and viewed within the context of a social network interface and web page.

Thus in the preferred embodiment, and contrary to prior art virtual worlds which create new virtual networks where users play characters other than themselves, Shaker relies on one or more social networks (such as Facebook and Google+) to provide Shaker with a real-life user base, where the user Avatar is taken from the user's social network information (e.g. photo, user identification, user supplemental information, user friends, user friends of friends, and so on). In Shaker, users do play characters that resemble themselves, or expressed alternatively, since they are portrayed by their real social network profile, the users "come as themselves".

Obtaining Real World Information on the User Base from Social Networks and Importing this to the Virtual World.

As previously discussed, unlike prior art virtual worlds that maintain their own user base were users invent new identities, Shaker relies on existing real social networks for a user base. Moreover, Shaker intentionally preserves the real-life identities of the users, as reflected in their social network profiles, and uses this real world identity information to represent users in Shaker's various virtual online social events.

Additionally, Shaker provides users with virtual social events that are much more suitable for solving the general problem of "meeting new people that are relevant to my real-life situation".

The solution Shaker provides includes a software methodology and data structure that enables Shaker's system to be run as a layer easily placed over any social network. Further, Shaker's methods project Shaker's users into a virtual social event as avatars that "carry" the user's previously established social profile. Shaker also provides easy to use graphical methods to allow other members, with proper permissions, to access another user's social profile in real-time from within a Shaker virtual online event.

By contrast, although prior art Facebook applications may use Facebook's user base for members, once members are enrolled, the prior art Facebook applications then go and generate yet another layer of application user profiles. This second layer of application user profile operates to shield or hide much of the Facebook profile data from the users of the application. For example, in Facebook application, although Facebook friends can help tend the Farmville user's farm, the application otherwise makes little use of the Facebook user profile data. Thus this application may be good for growing imaginary farms, but otherwise relatively useless for creating new and mutually beneficial social contacts that can be of utility in the real world as well.

GeoChat: Proximity Based Multiple Conversations in a Semi-Realistic Virtual Environment.

To facilitate new social interactions in the virtual world, users are typically provided with the availability to allow their avatars to converse in a virtual world analogy to a typical party conversation. This option is referred to here as "GeoChat". As will be discussed in more detail in subsequent patent applications, GeoChat is a series of methods and algorithms designed to allow avatars, while conversing in the virtual world, to automatically be positioned and interact in a way that closely simulates many of the unspoken rules that govern positioning and interacting in real-world conversations.

In the GeoChat option, a group of user avatars, when engaged in conversation, are shown in the various user's GUI as standing close to one another and facing in a natural way that takes various considerations into account, such as the positioning of the virtual furniture, the direction where real-life conversation participants might face, and also potentially other factors such as the viewpoint of the various users who are observing the virtual world from the standpoint of their various computerized device's GUI. Here the Agora/Shaker computer system may, for example, automatically select the participants of the conversation based on their proximity to the conversation initiator. In addition, the sequence of joining an existing conversation depends on the type of conversation, public or private, thus moderating the level of control that current participants of the conversation have over the conversation.

As will be discussed, in addition to considering information derived from real world social network data, the invention's PTI methods often also keep track of the user's history of virtual world conversations (i.e. GeoChats), as well as other virtual world interactions. Here the idea is that a more extensive virtual world history of interactions is also a good predictor of the respective user's future probability to interact (PTI).

To elaborate further, Agora/Shaker's GeoChat function provides a virtual world environment that, like the real world, permits and indeed encourages proximity based group conversations. The Agora/Shaker system, while often not monitoring the specifics of the "GeoChat" conversations out of privacy concerns, can nonetheless extract useful information from the GeoChat sessions that can be useful in subsequent PTI calculations.

Examples of Shaker in operation are shown in the following Figures.

Figure 3:
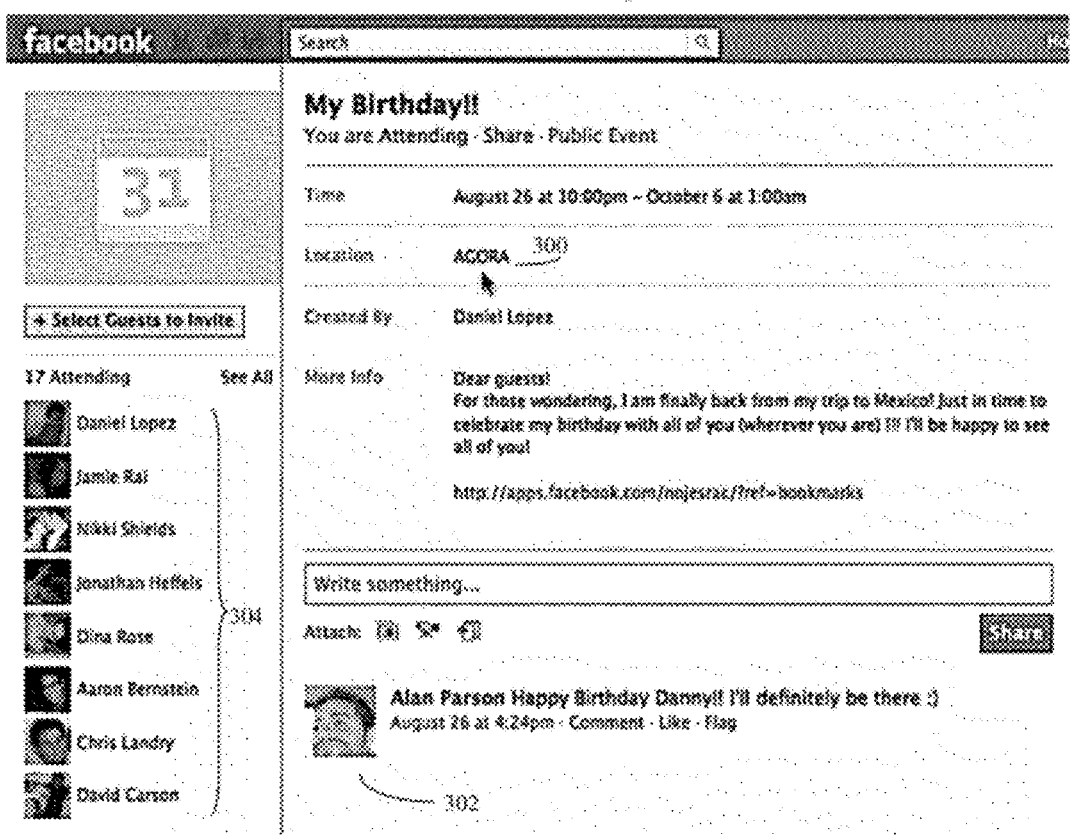
FIG. 3 shows a web page from a user's Internet based social network, here using Facebook as an example.

FIG. 3 shows an example of an Agora (Shaker) event, here shown embedded within a standard Facebook social network page. The link will take interested Facebook users to the Agora (Shaker) event. Here the type of event (a birthday), time of the event, Shaker link, and who created the event are shown. The user Alan Parson (302) is about to click on the link that (300) opens up the Agora (Shaker) party interface page. Some of the other social network members that are currently attending this party are shown as (304)

Figure 4:
FIG. 4 shows an overview of an Agora/Shaker virtual birthday party, here illustrated as operating within the associated social network system to emphasize the social network connection.

FIG. 4 shows a picture of the ongoing Agora/Shaker virtual birthday party. Here various male and female avatars are shown interacting in a virtual bar setting, and the Facebook profile photos of the avatar's various real-world users are shown linked to the avatars.

Figure 5:
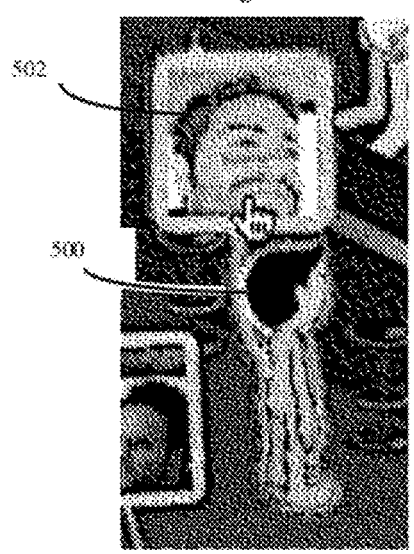
FIG. 5 shows a close-up of the user's avatar, showing his associated social network photograph.

FIG. 5 shows a close up of the user's (here Alan Parson's) avatar (500), showing his associated social network photograph (502). This avatar represents the point of view of the user who has just clicked on the link in FIG. 3, and is also the main point of view for the purposes of this disclosure.

The other avatars represent other people who are present in the Shaker virtual party in real time. Often the figures will be color coded. Thus, for example, figures may be color coded blue to represent the direct Facebook friends of the user from FIG. 5, while the indirect "Friends of Friends" of the user may be given a different color, such as yellow. By contrast, avatars being run by Facebook strangers to the user in FIG. 5 can be given a third color, such as gray. Note that although the present application figures, being rendered in black and white as per drawing requirements, do not show these colors, the colors may be found in the corresponding images from provisional application, 61/394,151, incorporated herein by reference.

The users can usually command the avatars by mouse click or button push (or by finger swipe or even by hand motion or verbal command), to walk around the Shaker virtual party (here shown in 2D isometric format). Just as in the real world, the Shaker avatars can walk around, dance, chat, and go to the bar and have a "drink". Here, even though the user from FIG. 5 has not yet joined a particular conversation, the user, although not able to see the details of the conversation, can at least see that others are talking to each other by way of their conversation balloons. Here, due to the previously described GeoChat feature, the conversing users are physically close to each other.

Once the user has stepped close enough to the other participants, (e.g. FIG. 6), the user can now see the other user's comments in the chat box, and also enter his or her own comments. The chat box can also show exactly who is now participating in the conversation. This is shown at the bottom of FIG. 6.

Figure 6:
FIG. 6 shows an overview of the portion of the virtual room where an avatar virtual conversation is taking place.

FIG. 6 shows an overview of the portion of the virtual room where an avatar virtual conversation (GeoChat) (600) is taking place, and also shows one type of GeoChat text interface (602). Many alternative GeoChat text interfaces are possible, and in other embodiments, the GeoChat interface may be an audio interface, allowing the various GeoChat participants to speak and talk directly using suitable audio equipment.

Figure 7:
FIG. 7 shows that clicking on another user's avatar can cause the Shaker system to produce a mini-social network interface that reveals additional information from the other user's social network.

By contrast, in FIG. 7, the user has now clicked on this other user's avatar, and the Shaker interface shows an abstract of the other user's Facebook social data, here shown in a Facebook like summary inset box, still while within the Shaker virtual party room.

As FIG. 7 also shows, clicking on another user's avatar (700) can cause the Shaker system to produce a mini-social network interface (702) that reveals additional information from the other user's social network. The Shaker system can also provide a menu of options for interacting with that other user as well. This menu can contain various interaction options, such as Poke (same as a Facebook Poke), Treat (i.e. give a virtual gift such as a virtual drink, flowers, item of avatar apparel, etc.), Whisper, or Challenge (to a different online game embedded in the virtual world).

In this example, suppose our use now decides to wander off and strike up a conversation with another member's avatar which is standing by herself (alone) next to the virtual bar. This other avatar has a color marking (e.g. yellow) indicating that this avatar belongs to a friend of a friend. When the user clicks on the other avatar, various options to interact with the other user's avatar pop up, along with an abstracted version of the other user's social network profile, which is shown in FIG. 8.

Figure 8:
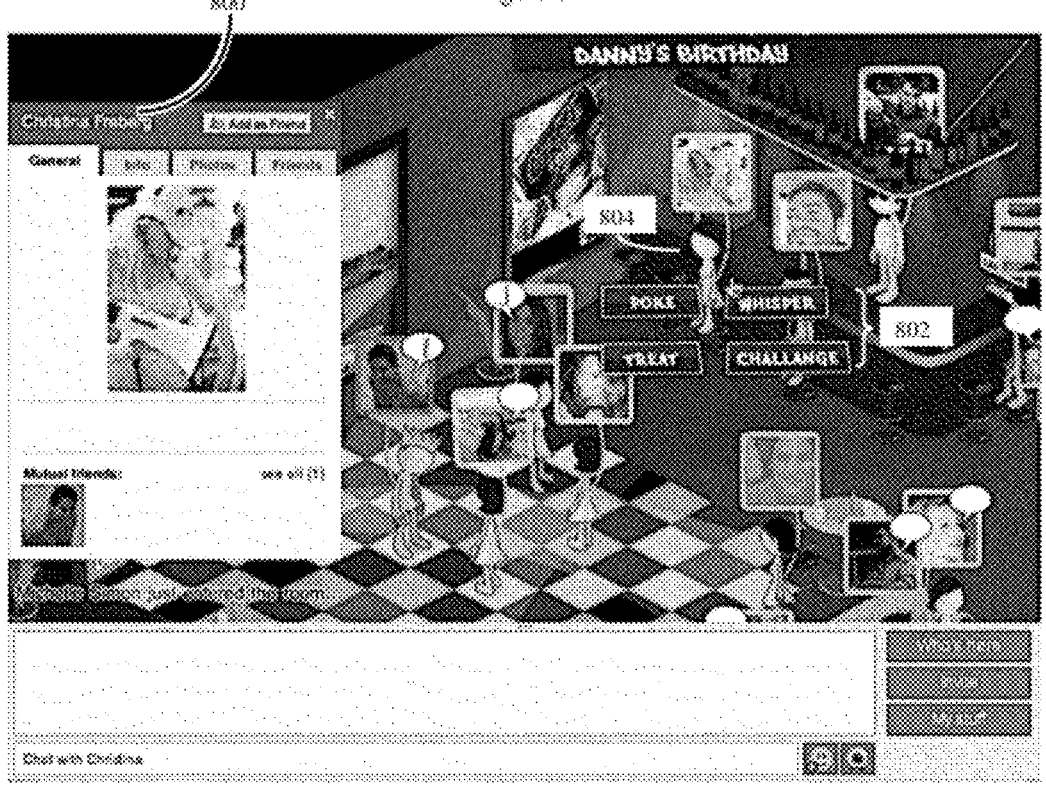
FIG. 8 shows another example of another user's Shaker social network interface.

FIG. 8 shows another example of another user's Shaker social network interface (800), along with the various interaction options (802) that are brought up when the other user's avatar (804) is clicked on.

Figure 9:
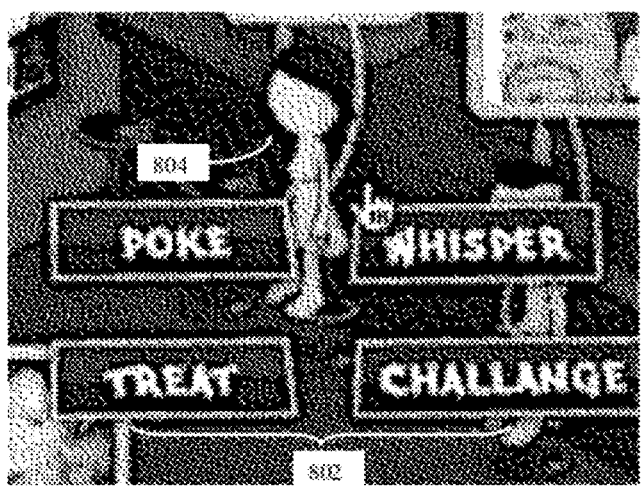
FIG. 9 shows a close up of the various user interaction options.
Figure 10:
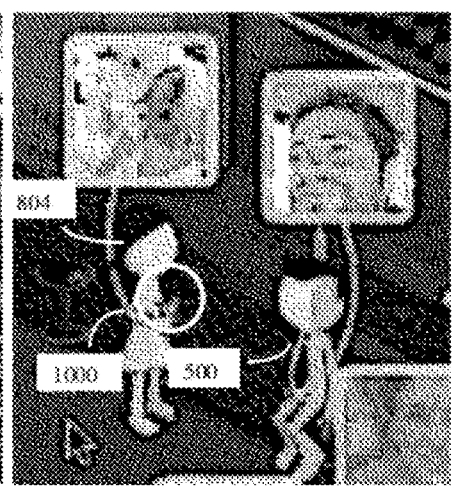
FIG. 10 shows the result of clicking on the "treat" option. Here the user has purchased a virtual "drink" gift for the other user's avatar, and the other user's avatar is holding the virtual drink.

In FIG. 9, the various interaction options (802) (e.g. Poke, Treat, Whisper, and Challenge to a game) are shown in more detail. In this example, our user from FIG. 5 will show interest in the user of the other avatar by clicking the "Treat" option. In FIG. 10, the results of this "Treat option" are shown. Here our user Alan (500) has purchased a virtual "drink" for the other user's avatar (804) and the other user (Christina) has accepted. Her avatar is now holding a small graphic showing this virtual "drink" (show inside the circle) (1000).

PTI Methods.

At this point, given the overall context and background of the Agora/Shaker system, it is now time to turn to a detailed discussion of the various PTI methods and algorithms which, operating behind the scenes, are responsible for making Agora/Shaker a successful tool for promoting social interactions.

As may now be appreciated, one important purpose of the Agora/Shaker system is to provide an online virtual environment designed to facilitate real world relationships. To do this, as previously discussed, it is important to bring together avatars from user/members where the probability of interaction is good. To do this, the system must continually be evaluating both the real world and virtual world relationships between the various member/users, and then seek to structure the arrangement of avatars and the virtual world environment in a socially favorable manner.

To do this, the probability of interaction (PTI) between the various user/member avatars must be continually evaluated, both on a one on one basis, and also across groups of user/member avatars as well. However before more complex group oriented PTI calculations must be made, the PTI between any two individual user/members must be estimated. This PTI is based upon real word "social connection" interaction between the various user/members, here usually obtained from social network information accumulated by social network sites such as Facebook. The PTI is also based upon the prior interactions (virtual world interactions) between the avatars belonging to the various user/members in the Agora/Shaker online virtual environment as well.

Figure 11:
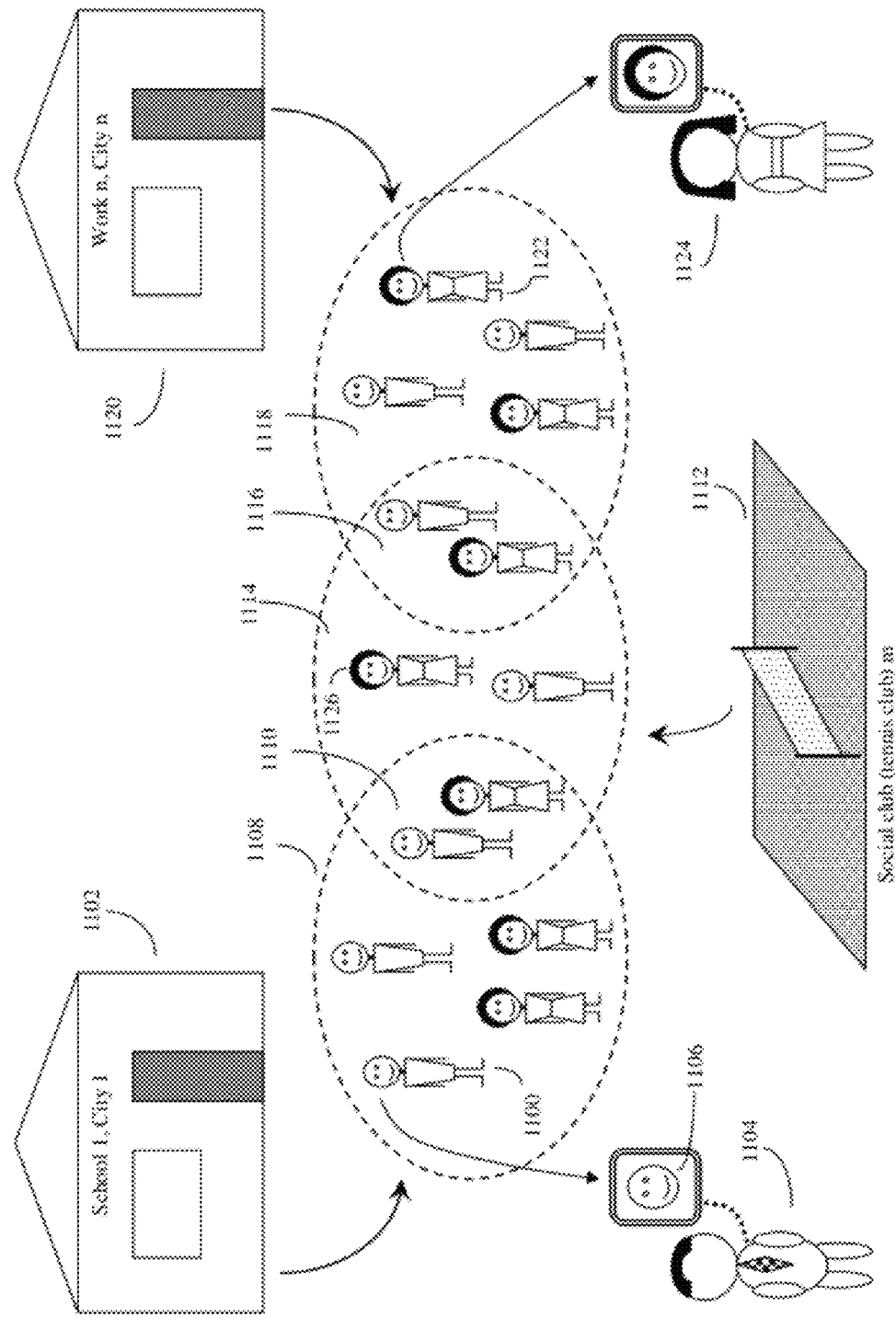
FIG. 11 shows an example of some of the various real world social connection interactions between members of a social network based online virtual environment.

FIG. 11 shows a simplified overview of some of the real world interactions between the user/members of the Agora/Shaker system. Here for example, our user of interest (1100) attends school 1 in city 1 (1102), and when on the Agora/Shaker system, user/member (1100) is represented by avatar (1104). This avatar may be easily visually distinguished from other avatars because, among other things, his avatar (1104) shows a social network photo (1106) of user (1100).

Here further assume that the user's real world friends (1108) are all drawn from the students of real world School 1 in City 11 (1102). Some of the friends (1110) of user (1100) also attend an outside real world social club (1112), such as a tennis club, where they meet and become friends with other individuals (1114), (1116). Individuals (1114) and (1116) are thus "friends of friends" in social network terminology. Further assume that some (1116), (1118) of the other members of the social club (1112) are drawn from employees of real world workplace "n" in nearby city "n" (1120). Here, for example, one of the other members (1122) of the social club (1112) works at workplace (1120), and when she goes online in the Agora/Shaker system, she is represented by avatar (1124). Here, the fact that user (1100) and (1122), when meeting in the online Agora/Shaker virtual environment, have friends of friends in common somewhat increases the probability that they may share other things in common as well, and this increases the chances of a good probability of interaction (PTI) over the random baseline PTI.

In FIG. 12, shows a diagram of the online Agora/Shaker virtual environment, previously discussed and shown in FIGS. 2-10. Consider now the effect of prior virtual world interactions between user/member avatars in the virtual environment, and the effect of these virtual world interactions on the PTI.

In FIG. 12, various user/member avatars, such as avatar (1104) and (1124) previously shown in FIG. 11 are shown interacting in a given virtual "room" in the Agora/Shaker virtual environment in various ways. For example, in (1200) and (1202), two different groups, each composed of three user/members, are using their avatars to engage in an online GeoChat conversation, similar to the GeoChat conversation previously discussed in FIG. 6 (600). This is one way to interact. By contrast, in (1204), one user member, perhaps member (1126) from FIG. 11, is checking out the social network profile information of another user member, perhaps (1104) from FIG. 11. This "checking out" may be done in a manner similar to that previously discussed in FIG. 7 (702). This is another way to interact. In (1206), one user member is showing interest in another user member by "treating" her to a virtual drink, similar to the examples previously discussed in FIGS. 9 and 10. This is a third way to interact. There can be many other ways to interact in the virtual world as well (not shown).

Here, if one user/member is sufficiently interested in another user/member to interact with them on the virtual world online environment then (at least if the other user/member does not object) the invention's PTI estimation system and method then gets further virtual world information suggesting that there may be a higher probability that the two user/members may interact further in future virtual meetings.

In addition to this virtual world interaction data, which can be collected automatically by the system, the user/members can also manually give the system additional information to evaluate as well. For example, upon user option, additional encounter feedback such as "positive", "negative", or "neutral" ratings regarding this interaction may be entered by the user. The system can also take this additional information into account in attempting to estimate the probability to interact (PTI) in the future. Absent negative feedback, generally more virtual world interactions, and particularly more recent virtual world interactions, would tend to suggest a higher PTI, while fewer interactions, or interactions in the more distant past, would tend to suggest a lower PTI. Of course a very negative feedback may cause the system to assign a zero or even negative (avoid) PTI value for this particular avatar pair.

Thus, at the heart of the PTI invention is a method for estimating the probability of interaction (PTI) between two avatars sharing the same online virtual environment; where each avatar is associated with a different user/member of an online social network. This method generally comprises: 1) determining the time history of virtual world interactions between the various user/members and computing at least one virtual world PTI predictor value; and 2) determining the degree of social connection similarity between the members and generating a social connection PTI predictor value. The method will then determine an overall PTI predictor value using an aggregate function (aggregate operation) of this at least one virtual world PTI predictor value and social connection PTI predictor value(s). As will be discussed, these overall PTI (or PTI predictor values) can then be used to control various aspects of the online virtual environment.

FIG. 13 shows a diagram illustrating the considerations behind the system's computerized and automatic overall PTI predictor value in the possible interactions between three different user/members that control three different avatars, here (1104, 1124, and 1126) from FIG. 11. In other words, this diagram graphically shows some of the overall PTI calculations that the Agora/Shaker computer server automatically performs "behind the scenes". Note for example that when computing an overall PTI between the user/member with avatar (1104) and the user/member with avatar (1124), or the overall PTI between the user/member with avatar (1104) and the user member with avatar (1126), the system will take into account both their social connection similarity (e.g. 1300, 1304, 1308), as well as the history of their respective virtual world interactions (1302, 1306, 1310). In this example, the system might assign a higher PTI (1320) to the interaction between the user controlling avatar (1104) and the user controlling avatar (1126) because they have a higher degree of social connectivity, and also because although they may not have been participating in the same online conversations, the system (with appropriate permissions and feedback) can see that they are both repeatedly checking out each other's social network profiles (e.g. interaction 1204, previously discussed in FIG. 12 and FIGS. 7 and 8). The system might also use other social network data, such as the two user's respective ages, marital status, and genders, as previously discussed, and take this information into account in the PTI calculations well.

By contrast, the system might assign an intermediate PTI (1324) to the interaction between the user/member controlling avatar (1124) and the user/member controlling avatar (1126), because although they have a friends of friends social connection similarity (1304, 1308), they have only shared one conversation (1306), and perhaps this conversation is not all that recent. The system might also look at other social network factors (e.g. age, gender, marital status) and perhaps also not give as high a PTI rating here as well. Finally in this example, the interaction (1322) between the user/members controlling avatar (1104) and (1124) might be given the lowest rating based on a lesser degree of social connection similarity, lack of mutual interest in checking out social network information, and again other social network factors (e.g. age, gender, marital status). The system can then make the appropriate mathematical calculations (to be discussed), and use this comparative information to set up the virtual world, and distribute the avatars to various locations (e.g. virtual rooms, zones or regions of the virtual rooms) in the virtual world. The various virtual world interactions between users/members take place over a variety of different times. In some embodiments, the system may choose to weigh more recent virtual world interactions more highly than virtual world interactions at earlier times. Here determining the time history of virtual world interactions between the various members may be done by computing a plurality of different virtual world PTI predictor values over a range of different time intervals. Different time weighting functions may be used. In some embodiments, all times are weighted equally, while in other embodiments, events taking place in the same day or session may be given a higher weight, and all events prior to the current session or day may be given a lower weight. Gradual time weighting or deweighting (e.g. linear, polynomial, exponential decay and other types of time deweighting functions may also be used as desired). Alternatively, some sort of periodic function, such as giving higher weight to online interactions that follow a regular periodic schedule, may also be used.

Some of the various virtual world interactions and other virtual world data that can be used to help construct the virtual world PTI predictor value can include information previously discussed, the information in FIG. 14, and other information such as member avatar appearance, number of virtual items exchanged between members, amount of social network information pertaining to the members that has been viewed, number of direct chat invitations, number of direct chats, length of these direct chats, semantic complexity of these direct chats, and number of accepts to a mutual multi-party conversation. Other rating information, such as member supplied positive, negative, neutral or other type ratings may also be used.

A list of some of these virtual world interactions, along with an example of some of the values that these interactions can be given, and an example of a weight that these various interactions may be given, is shown in FIG. 14. Note that the particular weights will often change as more data and user feedback becomes available, and indeed the weights need not be constant values. In alternative embodiments, the virtual world transformation operation that transforms these virtual world values into a virtual world PTI predictor value can also vary as a result of, for example, various machine learning algorithms.

Thus, in one embodiment, and using the table in FIG. 14 as an example, the virtual world PTI predictor value can be constructed from a function such as:

Virtual world PTI predictor value=0.15(Facebook friend request sent)+0.05(Came in through a shaker invitation sent by the other person)+0.25 (number of invitations sent)+0.05(number of mini-profile views)+0.05(number of drinks sent)+0.05(number of pictures viewed)+0.025 (number of drinks accepted)+0.025(number of chat invites accepted)+0.1(number of chats started)+0.15(number of who's here clicks).

Again note that these coefficients may be optimized as a function of data pertaining to system use and user satisfaction, and indeed may be dynamically altered based on machine learning algorithms and other factors.

Turning to the real world social connection PTI predictor value, this value may be determined by a social connection transformation operation using one or more social connection values, including the data previously discussed, the data shown on FIG. 15, and other information such as social network degree of separation, number of mutual friends, age, residence location, current location, occupation, schools, sexual orientation, gender, marital status, children, hobbies, political affiliation, and even automated image recognition of various social network photographs.

A list of some of these real world social connections, along with an example of some of the values that these social connections can be given, and an example of a weight that these various social connections may be given, is shown in FIG. 15. Note that here as well, these particular weights can change as more data and user feedback becomes available. As before, the weights need not be constant values. In alternative embodiments, the social connection transformation operation that transforms these social connection values into a social connection PTI predictor value can also vary as a result of, for example, various machine learning algorithms.

Mathematically, PTI can be computed by, for example, computing the probability of one user to initiate a significant Shaker interaction with another (currently, having a conversation), the next time they meet on Shaker. Since one person's "interest" in another doesn't necessarily reflect on the others, in one mathematical scheme, PTI may be assumed to be a non-symmetric probability function between pairs of users. Thus for example, the Joint PTI (JPT1) of two users A and B can be expressed as the additive sum of their individual PTIs such as:

JPT1(*A,B*)=PTI(*A,B*)+PTI(*B,A*).

Other schemes are also possible, however. In an alternative scheme, for example, The PTI can be broken down into their respective virtual world PTI and social connection PTI components, and the results combined using vector summation methods. In still other schemes, a multiplicative JPTI1(A,B) scheme may be used in which case the parties must exhibit substantial mutual interest in order for a large JTPT1 value to be obtained.

Overall PTI values can be constructed by, for example, using weighted functions or aggregation functions that may sum up to 1 such as: Overall PTI=50% present virtual world interactions+25% historical virtual world interactions+25% social connection similarity values.

Other types of aggregation functions or aggregation operations are also possible. These operations can range from simple summation functions, to more complex matrix (linear algebraic) methods, in which potentially each component of the various virtual world interactions and each component of the social connection similarity between two given avatars may have its own particular weight and significance relative to the other components. These methods may be optimized based on actual experience.

Matrix operations, although more computationally intensive, have the advantage of allowing the operators of the system to explore possible areas of synergism between different virtual world interactions and different real world interactions. Consider, for example, the simple virtual world act of glancing at another user's social network interface, such as FIG. 7 (702). Is this "flirting", which should possibly be reflected with an appropriate higher PTI predictor value, or is this simply random curiosity? This would likely be a function of various real world social connection values such as age, sex, and degree of social separation. For example, opposite sex individuals with roughly similar ages and less distant social connections might tend to have a higher PTI, particularly if there is viewing activity in both directions. By using a matrix based aggregation function that involves matrix multiplication, this type of interaction may be better discerned.

Alternatively, as previously discussed, this aggregate function or aggregate operation may simply sum up the values of the various PTI components, and simply compute a total score.

The overall PTI value calculations can also alter as a function of user time on the system. Thus initially, a new user with no history of virtual world interactions would be assigned an overall PTI based totally on the user's social connection similarity values. As time on the system increases, the social connection similarity values can then be deweighted and the virtual world interactions be given higher weight. The system may also dynamically recalculate PTI value as needed, such as every few minutes if desirable.

Thus, using FIG. 15 as an example, in one embodiment, the social connection PTI predictor value can be constructed from a function such as:

Social connection PTI=0.3(Degree of separation)+0.3 (number of mutual friends)+0.025(same hometown)+0.025(same location)+0.25(same school)+ 0.1(opposite gender)+0.1(age match).

Often the PTI methods of the present invention will be used on a massive scale to compute relative PTI values between a given member and many other members, or between groups of members. This can be a powerful tool for optimizing the online virtual world environment to promote social interactions between members.

Merging Events

As in real life, the success of many virtual social events, in the eyes of its guests, is often measured by both turnout—i.e. the number of guests, guest quality (i.e. is there a good PTI with respect to interacting with the other guests), and other considerations such as the level of entertainment and excitement the events provide.

Often, to promote good social interactions, rather than hosting having many small (e.g. few member avatars attending) events, often it is better merge the larger number of smaller events into a smaller number of larger events, preferably optimized for good attendee interactions. There is often a good attendance range, inbetween too few attendees and too many attendees, when the probability of good attendee interactions is high, and thus user satisfaction is also high. As will be discussed shortly, the present invention's PTI algorithms can be used to help Shaker provide an option to allow event creators to intelligently and automatically merge two related events, as well as intelligently and automatically splitting a too crowded popular event into smaller sub-events when needed. This PTI optimized merging and splitting functionality helps the event creator either revive an event that is suffering because too few individuals have signed up, alternatively improve the turnout of an ongoing event by easily increasing the guest list of potential participants and inviting them, or splitting a too large event. Thus Shaker is designed to use PTI related meta-data from smaller separate events to create a larger combined event. This option allows the current participants of the events to be informed of the virtual event union. Shaker also can preserve existing conversations from the various smaller events after the merger is done, and continue to make these accessible to the larger event as desired.

Further, as will also be discussed shortly, the present invention's PTI algorithms can also be used by Agora/Shaker to help the user make new acquaintances significant to his/her real life Shaker enables a virtual gathering of real-life social circles. Shaker is designed to encourage PTI optimized geographically based virtual events, as well as offering user gatherings that match the user's social and geographical profile. For example, Shaker may first offer a user from New York a list of virtual Shaker events selected from events where the guest list is compiled mostly from people from the New York area, such as Manhattan, and which (based on PTI considerations) preferably may already have a few of the user's local friends already attending. The goal here is to make Shaker events a fertile ground for making new, real-life, relationships, and this is facilitated by making new virtual contacts that are physically located close to the user's real-life location.

Users are free to specify other locations, as desired, so that a traveling user, or a user intending to move into a new area, can inform the system to override the default geographic preference, and instead prefer an alternate designated location.

An essential component in achieving this goal is bringing down the "friendship wall" that is at the heart of social networks. At present, social networks are designed so that in general, only direct friends of the user can properly interact with a user. Here, however, Shaker's use of event based privacy (i.e. providing an automatic option that allows a user to temporarily lower privacy settings for that specific event, and then automatically restore the privacy setting after that specific event) helps connect people from outside the user's immediate social belt, providing a virtual event framework that allows all event participants to interact, even if their former "friendship status" may have been remote or nonexistent.

To do this, while maintaining privacy where desired, Shaker may optionally offer either various Shaker custom privacy options, such as restrict to certain parts of the social profile being visible in the event, restrict to Facebook privacy settings, restrict to friends only (or to friends of friends only, friends of friends of friends only . . . ), and other options including options such as an "all may join" option or "all may see my full profile" option. In any case, these privacy settings will remain active only in Shaker events, not affecting the privacy settings imposed on the social network itself.

In general, as will also be discussed, the more social network information that the users/members choose to expose, the better that the invention's PTI methods can optimize the process of bringing users/members together in a way that optimizes the user/members probability to interact (PTI) in a generally favorable way.

FIG. 16 shows an example of how the system can massively compute a large number of total PTI values between a given member, and the other members present in one or more virtual rooms, thus creating a virtual room PTI that essentially describes the overall social desirability of that particular online virtual room from the perspective of that particular member.

In FIG. 16, an Agora/Shaker member (1600), perhaps returning online after a break for some real world activities, needs to determine which of the many virtual rooms or virtual environments in Agora/Shaker is likely to be most useful or productive in terms of having a large number other members with a of good probability to interact (PTI). In this simplified example, assume that there are two possible selections, virtual room 1 (1602) and virtual room 2 (1604). The Agora/Shaker system can compute the overall PTI between the member (1600) and each and every other member of virtual room (1602) as well as virtual room (1604) and compute an overall first virtual room PTI (1606) and an overall second virtual room PTI (1608).

A variety of different functions and mathematical operations can be used to compute a virtual room PTI. These can range from simple summation functions, which sum up the value of the various overall PTI for the various members in each room, to functions that give higher weight to the higher overall PTI values within a room, and other functions that may take other user habits and preferences into considerations, including certain avoidance preferences for some other members as desired.

Here the respective virtual room PTI values can, for example, be used by the system to either automatically assign member (1600) to the room with the highest virtual room PTI (1606 or 1608). Alternatively, the system can rank the rooms or otherwise give the member some information pertaining to the relative PTI desirability of the respective virtual room, and the member (1600) can then make an informed choice himself.

This process of massively computing a plurality of different overall PTI between larger numbers of members can be used for other purposes as well.

There is often a rough upper limit as to how many member avatars should be simultaneously online in the same virtual room at the same time. This upper number is a function of both the computation speed of the one or more Agora/Shaker servers that create the virtual environment, and also a function of the computing and graphics power of the various computers or computerized devices used by each of the online members to view the virtual room and control their avatars. Other considerations are that a too crowded room can feel less intimate, thus discouraging conversations, and in generally being difficult for members to manage. As a rough rule of thumb, for example, using standard servers and user computers available as of 2011, often a comfortable upper limit is around 80 member avatars per virtual room, although of course this number may vary. Thus when a "parent" virtual room becomes too crowded, it is useful to split or partition the avatars in this parent virtual room into two or more "child" virtual rooms. These child virtual rooms can have the same (or different) appearance as the parent, but of course the number of avatars present in the virtual room can be thinned down to a more comfortable number. Here the trick is to do this in a way that optimizes the various PTIs between the avatars so that overall member satisfaction remains high.

FIG. 17 shows an example of this virtual room splitting or avatar distribution method in operation. Here the avatars in a parent virtual room (1700), which has more than an optimal number of avatars, are partitioned or split into two child virtual rooms (1702), (1704) in a PTI optimized manner.

Here, the invention distributes the avatars in a parent virtual room (1700), in which the number of avatars exceeds the upper desirable limit, into first (1702) and second (1704) child virtual rooms in which the number of avatars does not exceed the upper desirable limit. This is done by determining which avatars (and their corresponding members) are presently engaged in conversations (e.g. 1706, 1708, 1710, 1712), where each conversation is comprised of one or more avatars (i.e. an avatar not talking to other avatars can be considered to be a conversation with one member) thereby creating a total parent virtual conversation set.

The avatars in these various conversations can be partitioned into the child virtual rooms (1702) and (1704) in a PTI optimized manner by repeating the steps of:

1: performing a selection process by selecting pairs of conversations C1 (e.g. 1706) and C2 (e.g. 1712) from the total conversation set in which the summation function of the overall PTI values between the members of C1 (1702) and members of C2 (1712) are lowest, putting the C1 members (1706) into the first child virtual room, putting the C2 members (1712) into the second child room, and then eliminating this selected pair of conversations from the total conversation set (i.e. go on to the next pair of conversations next time). Here the idea is to preserve active conversations, but pick the two conversation groups that have least in common, and try to put them into different child virtual rooms.

2: repeating this selection process using the remaining total conversation set, thus selecting conversations C1next and C2next (e.g. perhaps next do (1708) and (1714)), further determining which of the first (1702) or second (1704) child room to place members of C1next and members of C2next by determining the summation function of the overall PTI values between the members of the selected conversations (perhaps next 1708 and 1714) and the members of the child rooms (e.g. 1706 and 1712 for the next iteration), and assigning the respective selected conversation members (e.g. 1708, 1714) to the respective child room (1702) or (1704) that has the maximum summation function of the overall PTI values. In other words, if the next selected conversation pair is (1708) and (1714), compute the virtual room PTI between the members of (1708) and the avatars in virtual rooms (1702) and (1704), as well as compute the virtual room PTI between the members of (1714) and the avatars in (1702) and (1704), and put which ever next conversation (e.g. 1708, 1714) in the virtual room that has the best PTI fit.

Steps 1 and 2 are then repeated until all parent room avatars are automatically partitioned into the two child rooms. This method thus creates a more comfortable avatar population, preserves conversations, and also helps to maximize the chances that the various members are happy with their new child virtual rooms. In some embodiments, the system can allow the avatars from members that are dissatisfied with the new arrangement to manually override and pick the other virtual room as desired.

Other considerations, such as attempting to preserve the relative positions and states of the various conversations and avatars in the room can also be taken into account as well.

An illustration showing these and related concepts implemented in mathematical format is shown in FIG. 18. Here the two conversations with minimal PTI, as defined by equation 3 in FIG. 18, may be chosen and partitioned between rooms C1 (1702) and C2 (1704) as previously described. An alternate type of mathematical scheme for using PTI concepts to partition avatars between rooms is shown in FIG. 19.

It should be apparent that a similar type method may also be used to merge the avatars from various "parent" separate rooms into a combined and large "child" virtual room. Here the process is generally similar to FIG. 17, but in reverse. The main difference is that if there are only two "parent virtual rooms", then the process is a simple merge operation. But suppose that there are many potential "parent' virtual rooms to choose from to merge? Now which two "parent" virtual rooms are best suited for merger from a PTI standpoint?

Put more formally, in this merger operation, the avatars in two parent virtual rooms can be selected from a plurality of parent virtual rooms in which in at least one room, the number of avatars is less than a desirable lower limit, and in which the merged virtual rooms, the number of avatars will not exceed an upper desirable limit.

Here, for each of the plurality of parent virtual rooms in which in at least one room, the number of avatars is less than a desirable limit, the method will compute a best fit summation function of the overall PTI between the members of the first parent virtual room, and the members of a corresponding (potential second parent) virtual room. Based on the PTI results, the two parent virtual parent rooms in which said this best fit summation function of the overall PTI is maximal are chosen for merger.

By combining these PTI guided virtual room splitting and virtual room joining processes, even large virtual events may be dynamically expanded and contracted as per member participation in a manner not unlike an accordion.

PTI methods may also be used to control many other aspects of the Agora/Shaker online environment as well. For example, a given member's view of the other member's avatars can be color coded or otherwise altered by the overall PTI value between the two members. This is a bit of a generalization of the concept discussed earlier in the context of FIG. 5. Whereas in FIG. 5, only the one of the degree of social connection PTI data (friends, friends of friends, other) data was used to color the avatars, in an alternate schemes, Avatar appearance can be colored or otherwise altered by the respective PTI of the other avatars, as viewed from the graphical user interface (GUI) on the computerized device of the relevant participating member.

Comfort Zone: A Method for Placing a New Guest in a Virtual Social Event

As will be discussed, in another embodiment of the invention, the invention's PTI algorithms can be used to place the avatars of newly entering members into virtual environments, such as sections of virtual rooms, where the probability to interact is generally favorable.

Here, in real life, when we enter alone into a real social event, we usually look for someone we know to stand next to or join in conversation. A similar situation occurs in virtual social events, because there a user, upon logging into the system, almost always enters an online virtual event by himself or herself. Here the system needs to decide where, in the virtual event "room" to place the user's avatar.

Here, the invention's PTI methods and software act to place the user's avatar in an environment where the user feels most comfortable, which is generally near other "friendly" avatars where the PTI is good. These areas are called "comfort zones"—areas within the graphical representation of the social event, containing other user's avatars, where the new (entering) user's avatar is most likely to encounter a favorable social environment.

Here, in a manner to that discussed previously, the invention's PTI methods can, for example, divide even a single virtual event "room" into "comfort zones" or regions of a virtual room where the average or cumulative PTI is relatively high.

Here, the invention's PTI software implemented methods may calculates the comfort zone's level for a particular user based on various previously described PTI parameters such as the number of degrees of social separation (i.e. are the other avatars in the virtual room the user's friends, friends of friends, and so on), number of conversations previously held with users in previous Shaker events, social network joint interests and so on. The PTI based algorithm, software and method may generally attempt to place the user's avatar in the high PTI "comfort zone" region of a virtual room that is most suitable for him (unless of course the user wishes to select a different option). As a default, often if the user has been invited by another user already present in that particular environment, the new arrival's avatar may appear fairly close in location to the avatar belonging to the invitee.

PTI methods can also be used for other purposes as well. These include creating, for each member, a "high PTI directory" that can include other members, either presently online or not, that have a high PTI with any given member. This directory can include links for rapidly joining the other members in their respective virtual rooms, or otherwise contacting the other high PTI member.

PTI Optimized Virtual Events Guide

The PTI algorithms and methods of the present invention can also be used to create various types of PTI optimized virtual event guides. Here Shaker's Virtual Events Guide, or "smart-guide", allows Shaker's subscribers to find out what is going on in their virtual social environment. This guide can use PTI algorithms to determine what events are likely to have a net total PTI for that particular user, and list these events that are presently ongoing (e.g. "hot and happening now"), future events, as well as provide a magazine-like summary of past events (including pictures, highlights and gossip).

The smart-guide may additionally implement PTI based prediction algorithms to show Shaker's users the virtual Shaker events that PTI calculations, often supplemented by the user's prior event attendance history indicate to the system that the users are most likely want to take part in. In essence, this approach introduces new terminology into the social network experience, as when users ask themselves: "Where are my friends hanging out? What are my friends doing right now? Where should I go . . . ?" the system can automatically suggest likely high PTI candidates.

Virtual Event Priority Algorithm: A Method for Prioritizing Virtual Social Events Offered to a Member of a Social Network As time spent in virtual events increases, and the number of virtual events increases, the problem of finding the most interesting virtual social events, and managing the various virtual social events, starts to grow in importance. Here the invention's PTI methods may also help enhance the chance of finding promising future events.

Here the invention may PTI enhance a search engine that produces, as a result, a set of virtual events that are likely to be most relevant to a user. This requires that the system automatically prioritize various virtual events according to preset or user selected parameters.

Figure 20:
FIG. 20 shows a top portion of a PTI optimized Agora/Shaker virtual events guide.

An example of a PTI influenced Shaker virtual events guide is shown in FIG. 20. The event guide gives a snapshot or overview of the various Shaker virtual events. The guide can show Shaker events that have already happened, Shaker events that are currently happening, and Shaker events which will be starting shortly. In some embodiments the system can determine which members have registered in advance for these virtual events, or which members are presently at these virtual events, compute the appropriate PTI with the present member who is viewing the event page, and make the appropriate recommendations. Members may also choose to custom adjust their PTI functions in order to get the results most satisfactory to a given member.

Figure 21:
FIG. 21 shows a close up of a PTI based Agora/Shaker "where are my friends now?" search interface.

The Shaker virtual events guide can contain useful features such as the feature "what are my friends doing right now?" This is shown in more detail in FIG. 21. In FIG. 21, three things are happening. One group of three friends is at a Shaker virtual party called Lilinblum 6, another friend is at a Shaker event entitled Gad's birthday, and two friends are at a Shaker event at the Abraxes, a virtual Shaker night club. The user can look at these PTI selected friends, and can click on a group to join the friends in that group immediately. In addition to looking at the PTI for the friend or group of friends, this feature may also weigh the PTI of the other members at that particular event. This PTI information can optionally be visually displayed by an indicator, such as a number, bar, icon, or other visual indication method, or can be used to sort the events in order of overall preference.

Figure 22:
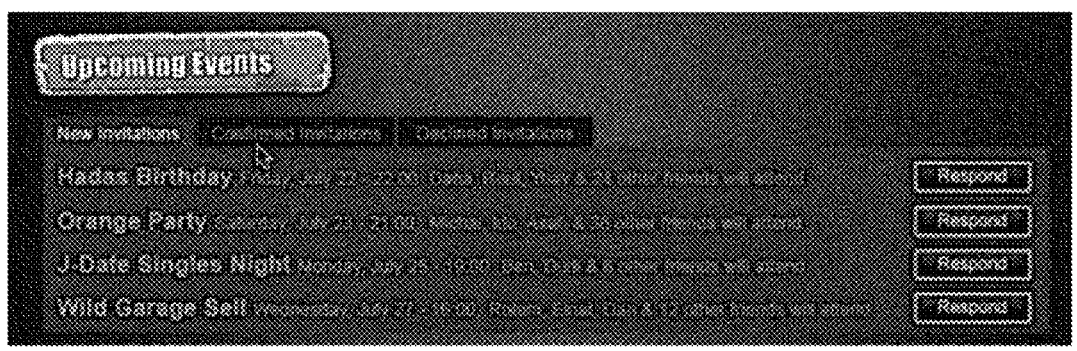
FIG. 22 shows a close up of a PTI optimized "upcoming events" search interface for future online events.

Another useful feature is the "Upcoming events" feature shown in FIG. 22. This feature shows new invitations, as well as previously confirmed and declined invitations. The virtual event guide lets the user schedule future events much like a regular calendar, and again can be adjusted to be PTI optimized.

Figure 23:
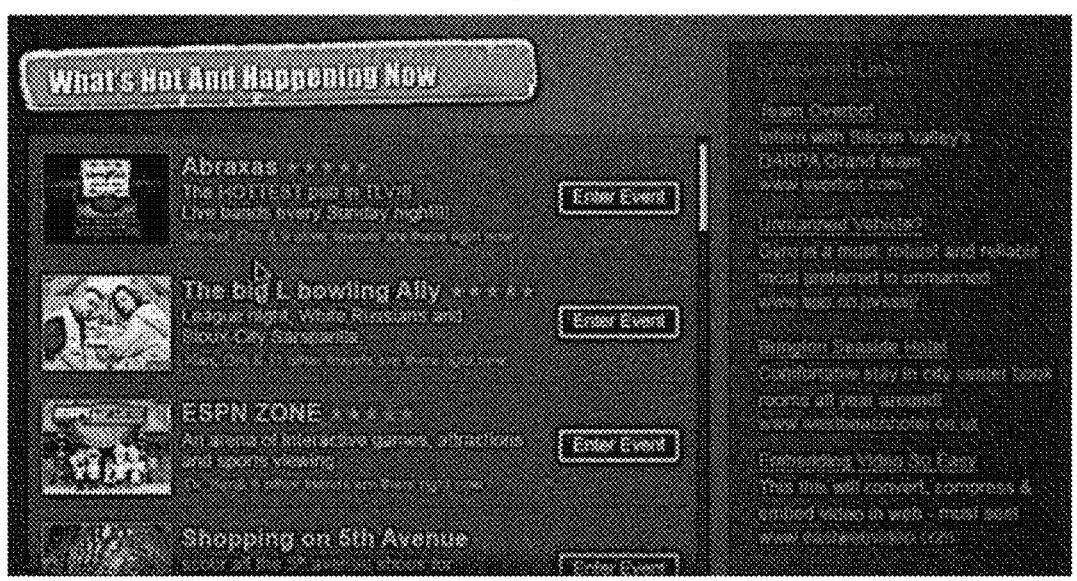
FIG. 23 shows a close up of a PTI optimized alternate "what's hot and happening now?" search interface for currently running online events.

Another useful feature is the "What's hot and happening now" feature, shown in FIG. 23. This feature shows the Shaker public virtual parties that are currently underway, and again these can be sorted or influenced by PTI.

The Shaker PTI influenced virtual event guide may also promote various activities. For example the application may use PTI calculations to determine that two of the user's best (highest level of activity with) social network friends are currently hanging out at a Shaker virtual party that may, for example, be commercially sponsored by a real bar or restaurant that is local to the users. This use of mixed real and virtual events can generate advertising revenue for the system, and also provides a convenient local place for the Shaker users to meet later if they decide that they would like to get together in real life.

Myspace® is a trademark of the Myspace Corporation, Facebook® is a trademark of the Facebook Corporation, Ning® is a trademark of the Ning Corporation, Google® is a trademark of the Google Corporation, Twitter® is a trademark of the Twitter Corporation, Tagged® is a trademark of the Tagged Corporation, Mafia Wars™, Farmville® and Zynga® are trademarks of Zynga Game Network World of Warcraft® is a trademark of Blizzard Entertainment Corporation.

The invention claimed is:

1. An automatic, computer implemented, method for estimating the probability of interaction (PTI) between a plurality of avatars sharing the same online virtual environment; each said avatar being associated with a different member of an online social network, said online social network existing independently of said online virtual environment, and comprising non-anonymous real-world data from non-anonymous real-world users;

said online virtual environment being a graphical virtual world environment;

said method comprising:

using at least one computer to obtain non-anonymous real-world user data from said social network;

obtaining an online virtual environment comprising a virtual world populated with a plurality of avatars, wherein each said avatar is associated with a different member of said online social network, and each avatar has linked social network comprising at least some non-anonymous real-world user data from said social network;

wherein said avatars comprise graphical representations of said users, and wherein said avatars are capable of user directed movement in said virtual world;

using said at least one computer to determine a time history of virtual world interactions between said members and computing at least one virtual world PTI predictor value;

wherein said at least one virtual world PTI predictor value is a virtual world PTI predictor value consisting of virtual world interactions between members and other in said online virtual world environment over a defined time interval, and in which determining the time history of virtual world interactions between said members and interactions between members and other members is done by computing a plurality of different virtual world PTI predictor values over a range of different time intervals;

using said at least one computer and information obtained from said online social network to determine a degree of social connection similarity between said members and generating a social connection PTI predictor value;

using said at least one computer to determine an overall PTI using an aggregate function of said at least one virtual world PTI predictor value and said social connection PTI predictor value;

using said overall PTI to control said online virtual environment;

wherein controlling said online environment further comprises distributing said avatars in a parent virtual room in which the number of avatars exceeds an upper desirable limit, into first and second child virtual rooms in which the number of avatars does not exceed the upper desirable limit, said method comprising:

determining which said avatars and corresponding members are presently engaged in conversations, each conversation comprising one or more avatars, thereby creating a total conversation set and repeating the steps of:

1: performing a selection process by selecting pairs of conversations C1 and C2 from said total conversation set in which a summation function of the overall PTI values between the members of C1 and members of C2 are lowest, putting the C1 members into the first child virtual room, putting the C2 members into the second child room, and then eliminating this selected pair of conversations from the total conversation set;

2: repeating said selection process using the remaining total conversation set, thus selecting conversations C1next and C2next, further determining which of said first or second child room to place members of C1next and members of C2next by determining the summation function of the overall PTI values between the members of the selected conversations and the members of the child rooms, and assigning the respective selected conversation members to the respective child room that has the maximum summation function of the overall PTI values.

2. The method of claim 1, wherein the range of different time intervals comprises the day and time that said method of claim 1 is performed, and all time intervals prior to the day and time said method of claim 1 is performed.

3. The method of claim 1, wherein weights are given to the plurality of different virtual world PTI predictor value over a range of different time intervals, and wherein the weights that are given to the plurality of different virtual world PTI predictor values over a range of different time intervals gives higher weight to more recent virtual world interactions.

4. The method of claim 1, wherein said virtual world PTI predictor value is determined by a virtual world transformation operation from one or more virtual world values selected from the group consisting of number of virtual items exchanged between said members, amount of social network information pertaining to said members viewed, encounter feedback with other members, semantic complexity of direct chats, and number of accepts to a mutual multi-party conversation.

5. The method of claim 4, wherein said virtual world transformation operation that transforms said one or more virtual world values into an virtual world PTI predictor value utilizes either constant coefficients, or alternatively coefficients that can be varied as a result of machine learning algorithms.

6. The method of claim 1, wherein said social connection PTI predictor value is determined by a social connection transformation operation using one or more non-anonymous real world social connection values from said online social network, said social connection values selected from the group consisting of number of mutual friends, age, occupation, sexual orientation, gender, marital status, children, political affiliation, and automated image recognition of social network photographs.

7. The method of claim 6, wherein the social connection transformation operation that transforms said one or more social connection values into a social connection PTI predictor value utilizes either constant coefficients, or alternatively coefficients that can be varied as a result of machine learning algorithms.

8. The method of claim 1, further computing the overall PTI between a given member and all other members on the online virtual environment based upon non-anonymous real-world user data from said social network, and data drawn from the member's history of virtual world interactions, and presenting said given member with a list of the other presently online members with the highest overall PTI.

9. The method of claim 8, further providing said given member with one or more links for said given member's avatar to enter into the same online virtual environment as the avatars corresponding to one or more of said other presently online members with the highest overall PTI.

10. The method of claim 1, further computing the overall PTI between a given member, and all other members in a given virtual room, thereby creating a virtual room overall PTI based at least in part on social network screened information.

11. The method of claim 10, in which there are a plurality of virtual rooms, further computing the virtual room PTI between a given member and more than one of said plurality of virtual rooms, and either recommending that said member's avatar go to the virtual room with the highest virtual room PTI, or automatically placing said member's avatar in the virtual room with the highest virtual room PTI.

12. The method of claim 10, in which the virtual room PTI is weighted to give a greater emphasis and greater virtual room PTI to virtual room members with a high overall PTI with said given member.

13. The method of claim 1, in which the upper desirable limit is determined as a function of experimental determinations of average member satisfaction with the probability of good attendee interactions.

14. The method of claim 1, in which the upper desirable limit is 80 members.

15. The method of claim 1, used to merge the avatars in two parent virtual rooms selected from a plurality of parent virtual rooms in which in at least one room, the number of avatars is less than a desirable lower limit, and in which said merged virtual rooms, the number of avatars will not exceed an upper desirable limit, said method comprising:
  for each of said plurality of parent virtual rooms in which in at least one room, the number of avatars is less than a desirable limit, computing a best fit summation function of the overall PTI between the members of the parent virtual room, and the members of a corresponding virtual room; and
  merging the two virtual parent rooms in which said best fit summation function is maximal.

16. The method of claim 1, in which a first member with a first avatar in said online environment uses said overall PTI to control the first member's view of an appearance of other avatars in said online virtual environment.

17. The method of claim 1, used to position a location of an avatar in a virtual room populated with other avatars.

18. The method of claim 1, used to control an output of a search engine used by a first avatar to search for present or future virtual events populated by other avatars.

19. The method of claim 1, wherein said aggregate function is comprised of one or more matrix operations performed upon matrices comprised of the various virtual world interactions in said online virtual environment and one or more social connection values, and wherein said matrix operations include matrix addition and matrix multiplication;
  wherein said virtual world interactions comprise at least one virtual world interaction selected from the group consisting of number of virtual items exchanged between said members, amount of social network information pertaining to said members viewed, encounter feedback with other members, semantic complexity of direct chats, virtual world interactions with other member's mini-social network interfaces, and number of accepts to a mutual multi-party conversation;
  wherein said social connection values comprise one or more non-anonymous real world social connection values from said online social network, said social connection values selected from the group consisting of number of mutual friends, age, occupation, sexual orientation, gender, marital status, children, hobbies, political affiliation, and automated image recognition of social network photographs;
  wherein said virtual world interactions and said social connection values are determined by non-anonymous real-world user data from said social network, and by data obtained from the record of said user's prior behavior in said online virtual environment.

20. The method of claim 1, wherein each avatar has a mini-social network interface linked with said avatar, and wherein said mini-social network interface further displays, as a mini-profile, information obtained from that avatar user's online social network, and additionally comprises a click activated interface that reveals additional information obtained from that avatar user's online social network.

21. A method for estimating the probability of interaction (PTI) between a plurality of avatars sharing the same online virtual environment; each said avatar being associated with a different member of an online social network, said method comprising:
  determining the time history of virtual world interactions between said members and computing at least one virtual world PTI predictor value;
  determining the degree of social connection similarity between said members and generating a social connection PTI predictor value;

determining the overall PTI using an aggregate function of said at least one virtual world PTI predictor value and said social connection PTI predictor value; and using said overall PTI to control said online virtual environment;

wherein using said overall PTI to control said online virtual environment comprises using said overall PTI to distribute said avatars in a parent virtual room in which the number of avatars exceeds an upper desirable limit, into first and second child virtual rooms in which the number of avatars does not exceed the upper desirable limit, said method further comprising:

determining which said avatars and corresponding members are presently engaged in conversations, each conversation comprising one or more avatars, thereby creating a total conversation set; and repeating the steps of:

1: performing a selection process by selecting pairs of conversations C1 and C2 from said total conversation set in which a summation function of the overall PTI values between the members of C1 and members of C2 are lowest, putting the C1 members into the first child virtual room, putting the C2 members into the second child room, and then eliminating this selected pair of conversations from the total conversation set;

2: repeating said selection process using the remaining total conversation set, thus selecting conversations C1next and C2next, further determining which of said first or second child room to place members of C1next and members of C2next by determining the summation function of the overall PTI values between the members of the selected conversations and the members of the child rooms, and assigning the respective selected conversation members to the respective child room that has the maximum summation function of the overall PTI values.

22. The method of claim 21, in which the upper desirable limit is determined as a function of experimental determinations of average member satisfaction with the probability of good attendee interactions.

* * * * *